US012780396B2

(12) United States Patent
Kappes et al.

(10) Patent No.: US 12,780,396 B2
(45) Date of Patent: Nov. 3, 2026

(54) NOSECONES FOR TURBINE ENGINE

(71) Applicants: Rolls-Royce Corporation, Indianapolis, IN (US); Rolls-Royce North American Technologies, Inc., Indianapolis, IN (US)

(72) Inventors: Matthew J. Kappes, Indianapolis, IN (US); Robert W. Heeter, Indianapolis, IN (US); Daniel E. Molnar, Jr., Indianapolis, IN (US); Matthew Hartzler, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 19/008,045

(22) Filed: Jan. 2, 2025

(65) Prior Publication Data

US 2026/0184415 A1 Jul. 2, 2026

(51) Int. Cl.
*B64C 1/06* (2006.01)

(52) U.S. Cl.
CPC ...... *B64C 1/0683* (2020.01); *F05D 2220/323* (2013.01); *F05D 2240/24* (2013.01)

(58) Field of Classification Search
CPC ..................................................... B64C 1/0683
See application file for complete search history.

(56) References Cited

U.S. PATENT DOCUMENTS 3,362,251 A * 1/1968 Francis .................... B63H 1/14
416/500
3,990,814 A * 11/1976 Leone ....................... B64C 7/02
416/245 R (Continued)

FOREIGN PATENT DOCUMENTS

DE 102010005987 B4 1/2013
DE 102010005986 B4 10/2017

(Continued)

OTHER PUBLICATIONS

U.S. Appl. No. 19/008,084, filed Jan. 2, 2025, naming inventors Kappes et al.

(Continued)

*Primary Examiner* — Brian Christopher Delrue
(74) *Attorney, Agent, or Firm* — Shumaker & Sieffert, P.A.

(57) ABSTRACT

A nosecone for a gas turbine engine includes a nosecone body substantially symmetrical around a central axis. The nosecone body includes a side wall which defines a diameter of the nosecone body that increases from a forward side to an aft side of the nosecone body. The nosecone further includes an attachment assembly which attaches the nosecone body to the gas turbine engine. The nosecone includes a plurality of airstream protrusions attached to or integral with the nosecone body. A first airstream protrusion of the plurality of airstream protrusions is positioned upstream of a first fan blade to prepare an airstream flowing over the nosecone body for interaction with the first fan blade. The (Continued)

attachment assembly includes a plurality of attachment locations, and a first attachment location of the plurality of attachment locations is collocated with the first airstream protrusion of the plurality of airstream protrusions.

17 Claims, 11 Drawing Sheets

(56) References Cited

U.S. PATENT DOCUMENTS

| | | | | |
|---|---|---|---|---|
| 4,393,650 | A | 7/1983 | Pool | |
| 4,780,262 | A * | 10/1988 | VonVolkli | B29C 70/44 264/258 |
| 4,931,026 | A * | 6/1990 | Woodland | B63H 5/14 60/221 |
| 6,447,255 | B1 * | 9/2002 | Bagnall | F02C 7/04 415/218.1 |
| 8,322,991 | B2 * | 12/2012 | MacFarlane | F04D 29/662 416/144 |
| 8,540,492 | B2 | 9/2013 | Schreiber | |
| 8,677,622 | B2 | 3/2014 | Schreiber | |
| 9,410,431 | B2 | 8/2016 | Bottome et al. | |
| 9,540,939 | B2 * | 1/2017 | Maliniak | F01D 9/041 |
| 9,879,698 | B2 * | 1/2018 | Burkholder | F04D 29/329 |
| 10,100,644 | B2 * | 10/2018 | Romanowski | F02C 3/04 |
| 10,392,949 | B2 * | 8/2019 | Roach | F01D 9/02 |
| 10,487,736 | B2 * | 11/2019 | Servant | B64C 11/14 |
| 10,507,904 | B2 * | 12/2019 | Scott | B64C 11/14 |
| 10,641,287 | B2 | 5/2020 | Kappes et al. | |
| 10,655,500 | B2 | 5/2020 | Heeter | |
| 10,746,031 | B2 | 8/2020 | Heeter et al. | |
| 11,078,839 | B2 * | 8/2021 | Heeter | F02C 7/04 |
| 11,143,103 | B2 * | 10/2021 | Lighty | F02C 7/04 |
| 11,267,576 | B2 | 3/2022 | Roach et al. | |
| 12,031,503 | B2 * | 7/2024 | Burza | F01D 5/02 |
| 2008/0022524 | A1 * | 1/2008 | Schreiber | F04D 29/023 29/889.21 |
| 2010/0258199 | A1 * | 10/2010 | Schreiber | F02C 7/04 137/15.1 |
| 2010/0260605 | A1 * | 10/2010 | Macfarlane | F01D 5/027 416/144 |
| 2011/0236217 | A1 | 9/2011 | Bottome | |
| 2012/0134843 | A1 * | 5/2012 | Bottome | F01D 5/066 416/245 R |
| 2013/0255277 | A1 * | 10/2013 | Macchia | F02C 7/04 427/436 |
| 2014/0186166 | A1 * | 7/2014 | Kostka | F01D 5/143 415/182.1 |
| 2014/0255204 | A1 * | 9/2014 | Totten | F01D 5/066 156/60 |
| 2014/0335752 | A1 * | 11/2014 | Ettin | D02G 3/16 428/221 |
| 2015/0003968 | A1 * | 1/2015 | Maliniak | F02C 7/04 415/209.2 |
| 2016/0010459 | A1 * | 1/2016 | Romanowski | F01D 5/066 416/245 R |
| 2016/0152320 | A1 * | 6/2016 | Kling | F02C 7/04 60/722 |
| 2016/0160863 | A1 * | 6/2016 | Roach | B32B 27/281 416/193 A |
| 2017/0211579 | A1 * | 7/2017 | Klauke | F02C 7/04 |
| 2019/0169990 | A1 | 6/2019 | Chaboud et al. | |
| 2019/0226401 | A1 | 7/2019 | Heeter et al. | |

FOREIGN PATENT DOCUMENTS

| | | | |
|---|---|---|---|
| EP | 3269961 | A1 | 1/2018 |
| WO | 2014120123 | A2 | 8/2014 |
| WO | 2014133636 | A2 | 9/2014 |
| WO | 2014143190 | A1 | 9/2014 |

OTHER PUBLICATIONS

Extended Search Report from counterpart European Application No. 25212744.4 dated May 13, 2026, 9 pp.

* cited by examiner

NOSECONES FOR TURBINE ENGINE

GOVERNMENT RIGHTS

This invention was made with Government support under Grant Contract Number FA8107-22-F-9005 awarded by the United States Air Force (USAF). The Government has certain rights in the invention.

TECHNICAL FIELD

This disclosure relates to nosecones for turbine engines.

BACKGROUND

Turbine engines used to propel vehicles, e.g., aircraft, often include a fan that is driven by an engine core. The fan blows air to provide thrust for moving the aircraft. The fan typically includes fan blades mounted to a wheel, and the wheel mounted to the gas turbine engine core. A nosecone or spinner may be mounted to the wheel to rotate with the fan. The nosecone directs air radially-outward from the center of the wheel and into the fan blades so that the fan can accelerate the air. Some nosecones include components made from composite materials.

SUMMARY

The disclosure describes nosecones for gas turbine engines. A nosecone, which may also be called a spinner, may be attached to an upstream side of a fan and direct air radially outward to a plurality of fan blades of the fan, where the plurality of fan blades can interact with inlet air to accelerate the air through the gas turbine engine.

As an upstream component of a gas turbine engine, the nosecone may face impact risks, such as from bird strikes, hailstones, ice shed from the aircraft, kicked up rocks if tail mounted, airborne debris, or the like. These impacts may lead to damage. Certain nosecones may address the challenges related to impacts to the nosecone by inclusion of heavy materials and/or a relatively thick side wall of the nosecone body. However, in such examples, the additional weight may reduce performance of the gas turbine engine.

The nosecone functions to direct air flowing over the nosecone radially outward where it is accelerated by the fan to provide thrust. The fan includes a plurality of fan blades. The performance of the fan (e.g., the magnitude of acceleration of the air) is at least partially governed by the interaction of the fan blades with the air flowing over the nosecone. Thus, improving the way air flows over the nosecone may improve performance of the fan.

The nosecone generally includes a nosecone body and an attachment assembly. The nosecone body is substantially symmetrical around a central axis and includes a side wall which defines a diameter of the nosecone body that increases from a forward side of the nosecone body to an aft side of the nosecone body. The nosecone further includes an attachment assembly configured to attach the nosecone body to the gas turbine engine. The attachment assembly may include a plurality of discrete attachment locations.

In accordance with one or more aspects of this disclosure, a nosecone includes one or more features configured to improve the impact resistance of the nosecone and/or the aerodynamic performance of the fan. For instance, the nosecone body and/or the attachment assembly may include a tear-resistant fiber. The tear-resistant fiber may enable the nosecone to be relatively lightweight, yet strong to resist forces acting upon the nosecone, and tough (e.g., reduced brittleness) to increase resistance to fracturing when struck by a foreign object. As such, nosecones described herein may be lighter, more robust, and/or may enable improved performance of the gas turbine engine.

In accordance with one or more aspects of this disclosure, a nosecone may include a plurality of airstream protrusions that may be attached to or be integral with the nosecone body. One or more of the airstream protrusions (e.g., each airstream protrusion) may be positioned upstream of a fan blade of the fan. The airstream protrusion may prepare the airstream flowing over the nosecone body for interaction with the fan blade. The airstream protrusion may be offset tangentially from the fan blade to align with air flow directionality and not be purely axially forward of the fan blade. The airstream protrusion may enable improved performance of the fan (e.g., effectively increasing a chord length of the fan blade). In some examples, a first attachment location of the attachment assembly may be collocated with a first airstream protrusion. For instance, a fastener of the attachment assembly may pass through the airstream protrusion, which may increase the impact resistance of the nosecone by increasing effective area being captured by the fastener to reduce peak loading during an impact event. In some examples, nosecones described herein may include a combination of features which both improve the impact resistance of the nosecone and the aerodynamic performance of the nosecone.

In an example, a nosecone for a gas turbine engine includes a nosecone body. The nosecone body is substantially symmetrical around a central axis. The nosecone body includes a side wall which defines a diameter of the nosecone body that increases from a forward side of the nosecone body to an aft side of the nosecone body. The nosecone includes an attachment assembly. The attachment assembly is configured to attach the nosecone body to the gas turbine engine. At least one of the nosecone body or the attachment assembly comprises a tear-resistant fiber.

In an example, a gas turbine engine includes a nosecone. The nosecone includes a nosecone body. The nosecone body is substantially symmetrical around a central axis. The nosecone body includes a side wall which defines a diameter of the nosecone body that increases from a forward side of the nosecone body to an aft side of the nosecone body. The nosecone includes an attachment assembly. The attachment assembly is configured to attach the nosecone body to the gas turbine engine. At least one of the nosecone body or the attachment assembly comprises a tear-resistant fiber.

In an example, an airframe includes a first gas turbine engine of one or more gas turbine engines. The first gas turbine engine includes a nosecone. The nosecone includes a nosecone body. The nosecone body is substantially symmetrical around a central axis. The nosecone body includes a side wall which defines a diameter of the nosecone body that increases from a forward side of the nosecone body to an aft side of the nosecone body. The nosecone includes an attachment assembly. The attachment assembly is configured to attach the nosecone body to the gas turbine engine. At least one of the nosecone body or the attachment assembly comprises a tear-resistant fiber.

In an example, a nosecone for a gas turbine engine includes a nosecone body substantially symmetrical around a central axis. The nosecone body includes a side wall which defines a diameter of the nosecone body that increases from a forward side to an aft side of the nosecone body. The nosecone further includes an attachment assembly which attaches the nosecone body to the gas turbine engine. The nosecone includes a plurality of airstream protrusions attached to or integral with the nosecone body. A first airstream protrusion of the plurality of airstream protrusions is positioned upstream of a first fan blade to prepare an airstream flowing over the nosecone body for interaction with the first fan blade. The attachment assembly includes a plurality of attachment locations, and a first attachment location of the plurality of attachment locations is collocated with the first airstream protrusion of the plurality of airstream protrusions.

In an example, a gas turbine engine includes a nosecone. The nosecone includes a nosecone body substantially symmetrical around a central axis. The nosecone body includes a side wall which defines a diameter of the nosecone body that increases from a forward side to an aft side of the nosecone body. The nosecone further includes an attachment assembly which attaches the nosecone body to the gas turbine engine. The nosecone includes a plurality of airstream protrusions attached to or integral with the nosecone body. A first airstream protrusion of the plurality of airstream protrusions is positioned upstream of a first fan blade to prepare an airstream flowing over the nosecone body for interaction with the first fan blade. The attachment assembly includes a plurality of attachment locations, and a first attachment location of the plurality of attachment locations is collocated with the first airstream protrusion of the plurality of airstream protrusions.

In an example, an airframe includes a first gas turbine engine of one or more gas turbine engines. The first gas turbine engine includes a nosecone. The nosecone includes a nosecone body substantially symmetrical around a central axis. The nosecone body includes a side wall which defines a diameter of the nosecone body that increases from a forward side to an aft side of the nosecone body. The nosecone further includes an attachment assembly which attaches the nosecone body to the gas turbine engine. The nosecone includes a plurality of airstream protrusions attached to or integral with the nosecone body. A first airstream protrusion of the plurality of airstream protrusions is positioned upstream of a first fan blade to prepare an airstream flowing over the nosecone body for interaction with the first fan blade. The attachment assembly includes a plurality of attachment locations, and a first attachment location of the plurality of attachment locations is collocated with the first airstream protrusion of the plurality of airstream protrusions.

The details of one or more examples are set forth in the accompanying drawings and the description below. Other features, objects, and advantages will be apparent from the description and drawings, and from the claims.

DETAILED DESCRIPTION

Figure 1:
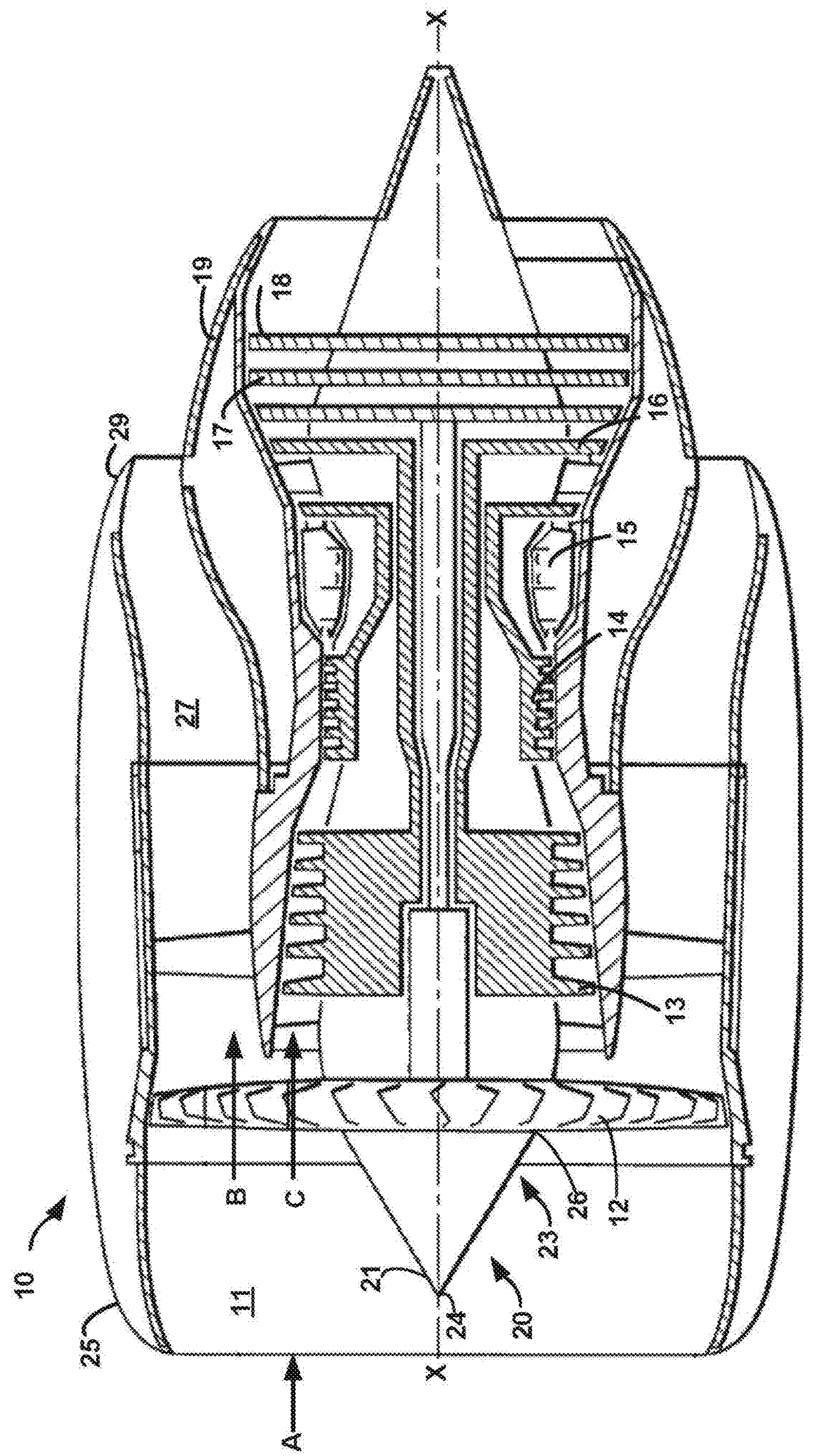
FIG. 1 is a schematic diagram illustrating a longitudinal cross-section view of an example gas turbine engine.

The disclosure describes nosecones for gas turbine engines used on aircraft. Nosecones may also be referred to as gas turbine engine spinners. Manufacturing of nosecones can present challenges in providing desired characteristics such as, for example, impact resistance, high aerodynamic performance, and light weight.

A nosecone includes a nosecone body formed substantially symmetrical around a central longitudinal axis and an attachment assembly for mounting the nosecone body to the gas turbine engine. The nosecone body includes a side wall defining a diameter of the nosecone that increases from a forward side of the nosecone body to an aft side of the nosecone body, e.g., along the central axis. For example, the nosecone body defines a conical shape (e.g., a half-cone) or conical frustum shape. In addition to defining the conical or conical frustum shape, the sidewall may taper from a minimum thickness (measured in a radial direction of the conical or conical frustum shape) near the apex of the cone (or the upper base of the conical frustum) to a maximum near the base of the cone (or the lower base of the conical frustum).

The nosecone also includes an attachment assembly configured to mount the nosecone to the fan, and thus to the rest of the gas turbine engine. The attachment assembly may be integrally formed with the nosecone body or may include one or more separate components. The attachment assembly may include a plurality of attachment locations. Each attachment location of the plurality of attachment locations may be displaced from every other attachment location of the plurality of attachment locations.

As an upstream component of a gas turbine engine, the nosecone may face impact risks, such as from bird strikes, hailstones, airborne debris, or the like. These impacts may lead to damage. Certain nosecones may address the challenges related to impacts to the nosecone by inclusion of heavy materials and/or a relatively thick side wall of the nosecone body. However, in such examples, the additional weight may reduce performance of the gas turbine engine or the aircraft for which it is providing propulsion.

The nosecone functions to direct air flowing over the nosecone radially outward where it is accelerated by the fan to provide thrust. The fan includes a plurality of fan blades. The performance of the fan (e.g., the magnitude of acceleration of the air) is at least partially governed by the interaction of the fan blades with the air flowing over the nosecone. Thus, improving the way air flows over the nosecone may improve performance of the fan.

A nosecone as described herein includes one or more features configured to improve the impact resistance of the nosecone and/or the aerodynamic performance of the fan assembly. As such, nosecones described herein may be lighter, more robust, and/or may enable improved performance of the gas turbine engine.

In some examples, the nosecone body and/or the attachment assembly may include a tear-resistant fiber. The tear-resistant fiber may enable the nosecone to be relatively lightweight, yet strong to resist forces acting upon the nosecone, and tough (e.g., reduced brittleness) to increase resistance to fracturing when struck by a foreign object. In some examples, the tear-resistant fiber may have one or more tear-resistant properties. For example, the tear-resistant fiber may have an elongation at break of from about 2.5% to about 3.5%. The tear-resistant fiber may have a breaking tenacity of at least about 40 grams/denier. In some examples, the tear-resistant fiber may exhibit a tensile strength of at least 5.0 gigapascals (GPa) and a tensile modulus of at least 160 GPa. In some examples, the tear-resistant fiber may have a combination (e.g., all) of these listed properties. Such a combination of properties, when present in a tear-resistant fiber, may enable fabrication of a nosecone with improved tear-resistant and impact-resistant properties. In some examples, the tear-resistant fiber may be poly (p-phenylene-2,6-benzobisoxazole)) (PBO) fiber. In others it may be Kevlar™ aramid fiber.

PBO fiber may exhibit, among other properties, excellent tensile strength, creep resistance, cut resistance, tear resistance, tenacity, and relatively light weight when compared with other fibers. As such, it may be desirable to include PBO fiber to improve the tear-resistance of the nosecone without significantly increasing the weight of the nosecone. However, PBO fiber may have other properties that make it less desirable for inclusion in a nosecone. For example, PBO fiber may be relatively more susceptible to degradation in the presence of visible and/or ultraviolet light and degradation in the presence of moisture than other types of fiber. Since the nosecone may be exposed to visible and/or ultraviolet light and moisture during operation of the gas turbine engine, inclusion of PBO fiber as a tear-resistant has presented challenges. In examples where PBO fiber is included as the tear-resistant fiber, nosecones described herein may selectively integrate the PBO fiber in locations where the impact resistance of the nosecone can be maximized while the deleterious impacts of ultraviolet light and moisture can be mitigated. For example, PBO fiber may be protected from an external and/or an internal environment of the nosecone by one or more layers positioned over and/or under layers that include PBO fiber. In this way, nosecones described herein may be relatively more robust, more lightweight, and have longer useful life than other nosecones. Alternatively, aramid (Kevlar) fiber may have positive strength, cut and tear resistance, and be relatively light but it is challenging to bond to which could be problematic for such a composite structure. However, if this fiber is included in a hoop-wise direction and the attachment fasteners are clamping it this reduces the risk of delamination in the composite with the Kevlar incorporation. Alternatively, aramid may be comingled, be a hybrid weave, or the like.

The side wall of the nosecone body may be formed from composite materials that are arranged into two-dimensional or three-dimensional architectures. In examples where the tear-resistant fiber is included in the nosecone body, the tear-resistant fiber may be included as all or part of at least one layer of the side wall. For example, the tear-resistant fiber may be included in one or more tear-resistant layers of the side wall of the nosecone body. In some examples, the tear-resistant layer(s) may include the tear-resistant fiber along with one or more other types of fibers. For example, the tear resistant layer(s) may include the tear-resistant fiber and a stiff fiber.

The stiff fiber may, for examples, include a carbon fiber, E-glass, or S-glass. The tear-resistant fiber may be intermingled with, braided with, interwoven with, or wound along with the stiff fiber to form the one or more tear-resistant layer(s) of the nosecone body. In some examples, a third type of fiber may optionally be included. The third type of fiber may be a tough fiber which has high elongation to failure but might be easily cut and low stiffness such as polyolefin polypropylene.

In some examples, to reduce degradation of the tear-resistant fiber by ultraviolet light and/or moisture, the tear resistant layer or layers may be protected from an external environment of the nosecone by one or more layers disposed over the tear-resistant layer which includes the tear-resistant fiber. The external layer may be one or more layers that include only the stiff fiber and/or the tough fiber, or may be an erosion-resistant coating layer, or both. Additionally, or alternatively, the tear-resistant layer may be protected from an internal environment of the nosecone by one or more layers disposed under (e.g., toward the central axis) the tear-resistant layer. Similarly, such layers may include layers of fiber that do not include the tear-resistant fiber and/or one or more coating layers.

In some examples, in addition to or alternatively to being integrated into the nosecone body, the tear-resistant fiber may be integrated into the attachment assembly. The attachment assembly may include a plurality of attachment locations. Each attachment location may include a fastener for attaching the nosecone body to the gas turbine engine. Upon an impact during operation of the gas turbine engine, the nosecone may be prone to fail at the attachment locations, where mechanical stresses may be concentrated in the nosecone body surrounding the fastener. In some examples, the tear-resistant fiber may be integrated into the attachment assembly and/or the nosecone body at the attachment locations. Inclusion of one or more layers of tear-resistant fiber at the attachment locations may better distribute (e.g., spread) forces at the fastener to a larger portion of the nosecone body. Distributing forces in this way may reduce the deleterious effects caused by hail or bird strikes, resulting in a more robust nosecone.

In some examples, an attachment location may include a fastener and at least one patch band surrounding the fastener. The patch band may increase the load-spreading area of the fastener to the nosecone body. The patch band may include the tear-resistant fiber. Inclusion of the patch band may reduce the propensity of the nosecone body to crack at the attachment location. In some examples, the patch band may be disposed on an internal surface of the nosecone body.

Nosecones described herein may include additional or alternative features configured to improve the performance and/or robustness of the nosecone. In some examples, a plurality of airstream protrusions may be attached to or integral with the nosecone body. One or more of the airstream protrusions (e.g., each airstream protrusion) may be positioned upstream of a fan blade of the fan. The airstream protrusion may prepare the airstream flowing over the nosecone body for interaction with the fan blade by modifying the flow path of the airstream flowing over the nosecone body. The airstream protrusion may enable improved performance of the fan (e.g., effectively increasing a chord length of the fan blade). For example, the airstream protrusion may alter the airstream flowing over the nosecone in such a way that the airstream is relatively more accelerated by the fan than it would be if the airstream protrusion were not included. In this way, efficiency of the fan may be increased, and the performance of the gas turbine engine may accordingly be improved.

In some examples the airstream protrusion may define a preferable aerodynamic shape. As described herein, an aerodynamic shape is a shape that reduces the drag from the airstream moving past the airstream protrusion, or results in less drag than surface mounted fasteners. For example, an aerodynamic shape may be any shape that results in less drag than a cubic block attached to the nosecone body. For example, the airstream protrusion may define a shape that has a cross-section that is substantially quarter-circular, or quarter-elliptical, or half-circular, or half-elliptical. In this way, performance of the downstream fan may be improved while penalties due to drag are reduced.

In example nosecones which include a plurality of airstream protrusions, a first airstream protrusion of the plurality of airstream protrusions may be collocated with a first attachment location of the plurality of attachment locations of the attachment assembly. For example, the attachment location may include a fastener, and the fastener may pass through the airstream protrusion. In this way, in addition to preparing the airstream for interaction with the fan blade, the airstream protrusion may further function to increase the load-spreading area of the fastener to the nosecone body. In some examples, the airstream protrusion may be positioned on a radially-outer surface of the nosecone body. In some examples, an attachment location of the nosecone may include both an airstream protrusion disposed on a radially-outer surface of the nosecone body and a patch band disposed on a radially-inner surface of the nosecone body. The airstream protrusion, the nosecone body, and/or the patch band may include the tear-resistant fiber. The load-spreading function of the airstream protrusion and the patch band may result in reduced concentration of mechanical stresses in the nosecone body surrounding the fastener. Thus, the nosecone may be relatively robust, lightweight, and enable improved performance of the fan.

FIG. 1 is a schematic diagram illustrating a longitudinal cross-section view of an example high-bypass gas turbine engine 10. The central axis (e.g., principal and rotational axis) of rotating elements of gas turbine engine 10 is the X-X axis. Gas turbine engine 10 includes an air intake 11, a fan 12, and a fan flow A. The fan 12 includes fan blades which are attached to a wheel. Nosecone 20 may be mounted to the wheel of fan 12. The core flow system C includes an intermediate-pressure compressor 13, a high-pressure compressor 14, a combustion chamber 15, a high-pressure turbine 16, an intermediate-pressure turbine 17, a low-pressure turbine 18, and a nozzle 19. Furthermore, outside the core flow system C, the gas turbine engine includes bypass flow system B. The bypass flow system B includes a nacelle 25, a fan bypass 27, and a fan nozzle 29. In other examples, high-bypass gas turbine engine 10 may include fewer components or additional components.

Thrust, which propels an aircraft, is generated in a high-bypass gas turbine engine 10 by both the fan 12 and the fan flow system A. Air enters the air intake 11 and flows substantially parallel to central axis X-X past the rotating fan 12, which increases the air velocity to provide a portion of the thrust. A first portion of the air that passes between the rotor blades of the fan 12 enters the core flow system C, while a second portion enters the bypass flow system B. Air that enters the core flow system C is first compressed by intermediate-pressure compressor 13, then high-pressure compressor 14. The air in core flow system A enters combustion chamber 15, where it is mixed with fuel and ignited. The air that leaves the combustion chamber 15 has an elevated temperature and pressure compared to the air that first entered the core flow system C. The air with elevated temperature and pressure produces work to rotate, in succession, high-pressure turbine 16, intermediate-pressure turbine 17, and low-pressure turbine 18, before ultimately leaving the core flow system C through core nozzle 19. The rotation of turbines 16, 17, and 18 rotates high-pressure compressor 14, intermediate pressure compressor 13, and fan 12, respectively. Air that passes through bypass flow system B does not undergo combustion and does not produce work to rotate turbines 16, 17, and 18, but contributes propulsive thrust to gas turbine engine 10.

During operation, blades of fan 12 rotate around central axis X-X, driven by low-pressure turbine 18. Nosecone 20 is mounted to fan 12. Nosecone 20 includes nosecone body 21 substantially symmetrical around central axis X-X. Nosecone body 21 of nosecone 20 includes a side wall defining a diameter of the nosecone body. The side wall may be tapered such that the thickness of the sidewall increases along central axis X-X from a forward side 24 of the body to an aft side 26 of the body. Nosecone 20 includes an attachment assembly 23 configured to attach the nosecone body of nosecone 20 to fan 12. Attachment assembly 23 may be disposed at or adjacent to aft side 26.

In accordance with one or more aspects of this disclosure, nosecone body 21 of nosecone 20 is formed of a composite material, which includes a matrix material, a stiff fiber, and a tear-resistant fiber. The stiff fiber is different from the tear-resistant fiber. The stiff fiber may contribute to the strength of nosecone 20. The stiff fiber may have an elongation at break of less than about 2.0%. The tear-resistant fiber may have a tensile strength of at least 5.0 gigapascals (GPa) and a tensile modulus of at least 160 GPa. In this way, the tear-resistant fiber may increase the impact resistance of nosecone 20.

The stiff fiber may include continuous fibers. In some examples, the stiff fiber may have an elongation at break of less than 2.0%. In some examples, the stiff fiber may include one or more of; carbon fibers, such as carbon fibers derived from polyacrylonitrile fibers; or some glass fibers, such as E-glass, an alumino-borosilicate glass with less than 1% weight-per-weight alkali oxides, or S-glass (an alumino silicate glass excluding CaO and including MgO).

In some examples, the stiff fiber may be relatively brittle, e.g., exhibit a relatively low elongation at break. Because of this, the impact resistance of nosecone 20 that includes only a matrix material and the stiff fiber may be relatively low due to the brittleness of nosecone body 21, and nosecone body 21 may suffer brittle failure upon impact from a foreign object, such as a bird, hailstones, or the like.

The tear-resistant fiber may a tensile strength of at least 5.0 GPa and a tensile modulus of at least 160 GPa. In some examples, the tear-resistant fiber may have a breaking tenacity of at least about 40 grams/denier. In some examples, the tear-resistant fiber may have an elongation at break of from about 2.5% to about 3.5%. In some cases, the tear-resistant fiber may exhibit the stated tensile strength, breaking tenacity, and elongation at break. As such, nosecone 20 may have both increased strength and increased toughness and thus be more resistant to impact damage, such as damage due to impact from a foreign object, such as a bird, a hailstone, or the like. In some examples, the tear resistant fiber may include poly (p-phenylene-2,6-benzobisoxazole)) (PBO) fiber, such as Zylon® AS, or Zylon® HM, which are available from TOYOBO MC Corporation of Osaka, Japan.

In some examples, nosecone 20 may optionally further include a tough fiber. In some examples, the tough fiber may have an elongation at break that is greater than about 10.0%. The greater elongation at break of the tough fiber relative to the other fibers may provide at least some structural integrity to nosecone 20 even if the matrix material cracks or delaminates from the stiff fiber or the tear-resistant fiber.

The tough fiber may include, for example, a polyamide; a polyester or polyester terephthalate (PET), such as Dacron®, available from IVISTA, Wichita, Kansas, or Vectran®, available from Kuraray Co., Ltd., Tokyo, Japan; a polypropylene, such as a high modulus polypropylene (HMPP), for example Innegra™ S, available from Innegra Technologies™, Greenville South Carolina; a polyethylene, such as high density polyethylene, high performance polyethylene, or ultra-high molecular weight polyethylene; spider silk; or the like. In some examples, the tough fiber may include a thermoset polymer, including but not limited to, an epoxy. In some examples, the tough fiber may be a polymer that cures at a relatively low temperature, such as less than about 150° C. For example, the tough fiber may include CYCOM® 823 ® (cures at a temperature of about 125° C. in about 1 hour), available from Cytec Solvay Group, Brussels, Belgium; HexPly® M77 (cures at a temperature of about 150° C. in about 2 minutes), HexPly® M76, or HexPly® M92 available from HEXCEL® Corporation, Stamford, Connecticut; TC250 (cures at a temperature of about 130° C. in about 2 hours) available from TenCate Advanced Composites, Morgan Hill, California; and Nelcote® E-765 (cures at a temperature of about 135° C. in about 2 hours) available from Park Electrochemical Corp, Melville, New York.

The tear-resistant fiber, the stiff fiber, and/or the tough fiber may be incorporated in nosecone body 21 in any desired manner. The fibers may define at least one architecture. An architecture includes a particular combination and physical arrangement of materials, such as a matrix material and at least one of a tear resistant fiber, a stiff fiber, and a tough fiber. The architecture may include strands, braids, weaves, windings, fabric layers, or the like. Strands include one or more tows, and tows include a plurality of fibers. Strands may be configured to form a pure braid, pure weave, pure winding, a hybrid braid, hybrid weave, hybrid winding, commingled braid, commingled weave, commingled winding, or the like. Nosecone 20 may include one or more architectures. The architecture for a region of nosecone 20 may be selected according to desired properties of that portion of nosecone 20, such as mechanical properties.

For example, nosecone 20 may include an architecture that includes one or more fabric layers. A fabric layer may be a pure fabric layer, which may include only one of the stiff fiber, the tear-resistant fiber, or the tough fiber. A fabric layer, in other examples, may be a hybrid fabric layer which includes at least two of the stiff fiber, the tear-resistant fiber, or the tough fiber. For example, the stiff fiber and the tear-resistant fiber may be braided, interwoven, or wound together to form a fabric layer. In some examples, a fabric may include warp yarns that includes the stiff fiber and weft yarns that include the tear resistant fiber and/or the tough fiber.

In other examples, nosecone 20 may include a commingled fabric layer. Commingled fabric layers include strands having at least two of the stiff fiber, the tear-resistant fiber, and the tough fiber. In some examples, nosecone 20 includes a commingled fabric layer in which commingled strands are braided, interwoven, or wound together to form a fabric layer. In other examples, both commingled fabric layers and hybrid fabric layers may be incorporated in nosecone 20. For example, a first fabric layer may include a hybrid fabric layer, and a second fabric layer may include commingled fabric layer. Other combinations are contemplated. Additionally, or alternatively, the tear resistant fiber, and/or the tough fiber may be integrated into nosecone body 21 of nosecone 20 as continuous fibers or filaments, chopped fibers or filaments, or the like.

Figure 2:
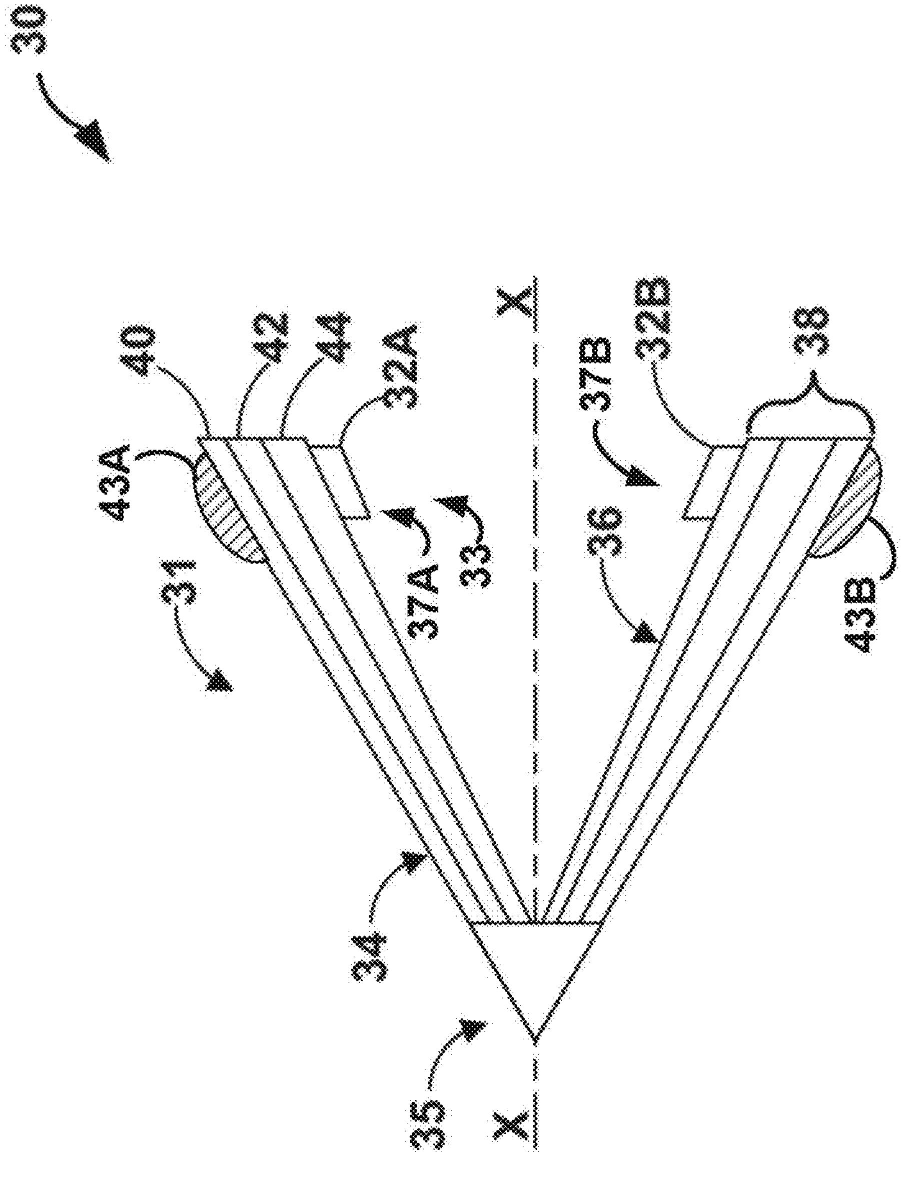
FIG. 2 is a schematic and conceptual diagram illustrating a longitudinal cross-section view of an example nosecone.

FIG. 2 is a schematic and conceptual diagram illustrating a longitudinal cross-section view of an example nosecone 30 that includes outer layer 40, middle layer 42, and inner layer 44 of fibers. Nosecone 30 includes a tear resistant fiber, as described above with reference to FIG. 1. Nosecone 30 also includes airstream protrusions 43A, 43B, in accordance with one or more aspects of the present disclosure.

Nosecone 30 includes nosecone body 31. Nosecone body 31 defines an outer surface 34 which directs air radially-outward from the center of fan 12 (FIG. 1) and into the blades of the fan along the central axis (e.g., X-X axial direction). Nosecone body 31 also defines an inner surface 36. Nosecone body 31 includes a side wall defining a diameter of body 31. The side wall of nosecone body 31 may be tapered such that the thickness of the sidewall increases along central axis X-X from a forward side of nosecone body 31 to an aft side of nosecone body 31. Nosecone 30 includes tip 35. Tip 35 may include a rubber tip or any other suitable material for the tip of nosecone 30. Nosecone 30 includes attachment assembly 33. Only a portion of attachment assembly 33 is pictured in FIG. 2. Attachment assembly 33 may include a plurality of fasteners and one or more additional layers and/or components, as will be further described below. Attachment assembly 33 may include first attachment location 37A and second attachment location 37B.

A portion of attachment assembly 33 may be integrally formed with nosecone body 31. Nosecone body 31 may be secured to fan 12 by a fairing (e.g., an annular frustum configured to surround a portion of nosecone body 31 and secure nosecone 30 to fan 12) or one or more attachment locations, such as attachment locations 37A and 37B.

Attachment locations 37A and 37B may include patch bands 32A and 32B, respectively. Patch band 32A may be layer disposed on inner surface 36, which may be integrally formed with nosecone body 31 or otherwise affixed to nosecone body 31. Patch band 32A may extend radially inward from inner surface 36 and be configured to secure nosecone body 31 to fan 12. Patch bands 32A and 32B may include any suitable geometry for attaching nosecone 30 to fan 12. For example, patch bands 32A and 32B interlock or physically contact with complementary pads on fan 12. As mentioned above, attachment locations 37A and 37B of attachment assembly 33 may include other mechanical features for attaching nosecone 30 to fan 12, such as a plurality of fasteners, (e.g., a fastener positioned at each attachment location 37A, 37B), a support ring, or the like.

In some examples, patch bands 32A, 32B may be separate, discrete patches disposed on inner surface 36 and surrounding a respective fastener. In some examples, patch bands 32A, 32B may be different portions of a single contiguous band that completely surrounds central longitudinal axis X-X. In any case, patch band 32A may be configured to increase the load-spreading area of a fastener at attachment location 37A to nosecone body 31. In some examples, patch band 32A may include the tear-resistant fiber. Inclusion of patch band 32A which includes the tear-resistant fiber may enable improved impact resistance of nosecone 30 by reducing the tendency of nosecone body 31 to crack or otherwise fail at attachment location 37A due to impact of nosecone body 31 with a bird, a hailstone, or the like. The tear-resistant fiber may possess a desirable blend of strength, flexibility, and other properties to absorb and transfer forces due to impact throughout a larger portion of nosecone body 31 and thus prevent failure at attachment location 37A.

Nosecone body 31 may include a plurality of layers 38. For example, as shown in FIG. 2, nosecone body 31 includes three layers including outer layer 40, middle layer 42, and inner layer 44. In some examples, nosecone body 31 includes fewer layers, such as, for example, one or two layers. In other examples, nosecone body 31 includes more than three layers.

Plurality of layers 38 includes a composite material that includes the stiff fiber, the tear-resistant fiber, and, optionally, the tough fiber. In some examples, each of outer layer 40, middle layer 42, and inner layer 44 may be a single fabric layer. In some examples, each of outer layer 40, middle layer 42, and inner layer 44 may include a plurality of individual fabric layers, which may be woven fabric layers or fabric layers generated by winding fiber around a nosecone mold. In this way, each of outer layer 40, middle layer 42, and inner layer 44 may include a plurality of sub-layers, and each sub-layer of the plurality of sub-layers may include an individual fabric layer.

In some examples, at least one (e.g., each) of plurality of layers 38 may include the tear-resistant fiber. In this way, the impact resistance of nosecone body may be improved relative to a nosecone body that includes only stiff fiber and/or tough fiber.

In some examples, only middle layer 42 may include the tear-resistant fiber. The tear-resistant fiber may be included as a pure fabric layer or as a hybrid and/or commingled fabric layer with one or both of the stiff fiber and the tough fiber. In such examples, the outer layer 40 and inner layer 44 may not include the tear-resistant fiber, such as including by including only the stiff fiber or a hybrid or commingled fabric layer of the stiff fiber and the tough fiber. In some examples, as mentioned above, the tear-resistant fiber may be PBO fiber, which has excellent tearing or cutting resistance but is relatively more susceptible to degradation by light (e.g., visible light and/or ultraviolet light) and relatively more susceptible to degradation by moisture than the stiff fiber and/or the tough fiber. By including the tear-resistant fiber in only middle layer 42, the tear-resistant fiber may be protected from the external environment of nosecone 30 by outer layer 40 disposed over the tear-resistant fiber. The tear-resistant fiber may be further protected from the internal environment of nosecone 30 by inner layer 44 disposed under the tear-resistant fiber.

In some examples, nosecone body 31 may include other materials in addition to a matrix material, stiff fiber, tear-resistant fiber, and tough fiber. For example, nosecone body 31 may include a low-density material, an erosion resistant coating, or both. A low-density core may be included between outer layer 40 and inner layer 44, e.g., all or a portion of middle layer 42 may include a low-density material. As one example, a low-density material may be used as middle layer 42, except in attachment locations 37A, 37B where a chopped fiber reinforcement architecture may be used. The low-density material of a low-density core may include a foam, balsa wood, birch wood, a honeycomb material, or the like. The low-density core may reduce weight of nosecone 30, while the sandwich-type structure of fiber layers on either side of the low-density core may provide sufficient mechanical properties to nosecone 30. Additionally, or alternatively, an erosion resistant coating may be included on outer surface 34 of nosecone body 31. An erosion resistant coating may be applied in liquid form or may be an erosion-resistant polymeric film that is adhered or co-cured to nosecone 30. In some examples, an erosion resistant coating may include a polyurethane, such as a polyurethane film available under the trade designation 3M™ Polyurethane Protective Tape 8734NA. In examples in which an erosion resistant coating is adhered to nosecone 30, the erosion resistant coating may be replaceable upon damage to the erosion resistant coating while reducing or substantially preventing erosion damage to the underlying nosecone 30. In some examples, the erosion resistant coating may have a relatively high elongation at break (e.g., similar to the tough fiber), which may contribute to toughness of nosecone 30. In examples where outer layer 40 includes the tear-resistant fiber, the erosion resistant coating may be the layer over the tear resistant fiber which protects the tear-resistant fiber from the external environment of nosecone 30.

In some examples, nosecone 30 may include a plurality of airstream protrusions 43A, 43B attached to or integral with nosecone body 31. Airstream protrusion 43A may be positioned upstream (e.g., directly upstream) of a first fan blade of the plurality of fan blades of fan 12. Put differently, airstream protrusion 43A may be positioned on outer surface 34 coincident with a line defined by tip 35 and a center of a base of the first fan blade. Airstream protrusion 43A may be configured to prepare the airstream flowing over nosecone 30 for interaction with the first fan blade. For example, airstream protrusion 43A may extend from outer surface 34 into the airstream and alter the flow path of the airstream ahead of the first fan blade. The modification of the flow path of the airstream by airstream protrusion 43A may effectively increase the effective chord length of the first fan blade (e.g., such that, in effect, the effective chord length of the first fan blade is longer than the actual physical chord length of the first fan blade as the effective chord begins forward in the airstream of the physical front of the first fan blade). Such increased effective chord length of a fan blade may generally result in increased acceleration of the airstream by fan 12. Increased acceleration of the airstream may result in increased propulsion by fan 12. Accordingly, the performance of the fan blade and thus fan 12 may be improved.

In some examples, each respective airstream protrusion 43A, 43B may be positioned upstream of a corresponding fan blade of fan 12. For example, first airstream protrusion 43A may be positioned upstream of the first fan blade, and second airstream protrusion 43B may be positioned upstream of a second fan blade of fan 12. In this way, performance of each fan blade of plurality of fan blades may be improved by a respective airstream protrusion of the plurality of airstream protrusions.

In some examples, airstream protrusion 43A and/or airstream protrusion 43B may define an aerodynamic shape. An aerodynamic shape is a shape that reduces the drag from the airstream moving past the airstream protrusion. For example, airstream protrusion 43A may define a shape that has a cross-section that is substantially quarter-circular, or quarter-elliptical, or half-circular, or half-elliptical. In this way, performance of fan 12 may be improved by airstream protrusion 43A while penalties due to drag are reduced.

In some examples, as illustrated, airstream protrusion 43A may be collocated on nosecone body 31 with attachment location 37A of attachment assembly 33. In such examples, a fastener may be configured to pass through airstream protrusion 43A and nosecone body 31 to attach nosecone 30 to fan 12. In such examples, airstream protrusion 43A may function to increase the load-spreading area of the fastener to nosecone body 31, in addition to preparing the airstream for interaction with the fan blade. As such, airstream protrusion 43A positioned at attachment location 37A may enable improved robustness of nosecone 30 in addition to improving performance of fan 12.

While both airstream protrusion 43A and patch band 32A may each individually improve the mechanical robustness of nosecone 30 on their own, in some examples, attachment location 37A may include both airstream protrusion 43A formed on or attached to outer surface 34 and patch band 32A formed on or attached to inner surface 36, as illustrated. A fastener may pass through airstream protrusion 43A, nosecone body 31, and patch band 32A. Stresses from a strike by a bird, hailstone, or the like on nosecone 30 may be distributed by airstream protrusion 43A and patch band 32A to a relatively larger area of nosecone body 31 than they would otherwise be distributed in the absence of one or both of airstream protrusion 43A or patch band 32A. As such, inclusion of both airstream protrusion 43A at outer surface 34 and patch band 32 at inner surface 36 of attachment location 37A may reduce the risk of failure of nosecone body 31 by reducing the concentration of mechanical stresses at the fastener.

Airstream protrusion 43A may be formed from any suitable material. In some examples, airstream protrusion 43A may be formed integrally with nosecone body 31. In such examples, airstream protrusion 43A may include any or all of the stiff fiber, the tear resistant fiber, or the tough fiber. Alternatively, airstream protrusion 43A may be attached to nosecone body 31 (e.g., by the fastener). In such examples, airstream protrusion may include any of the mentioned fibers or another material or materials, including metallic or ceramic materials.

Figure 3:
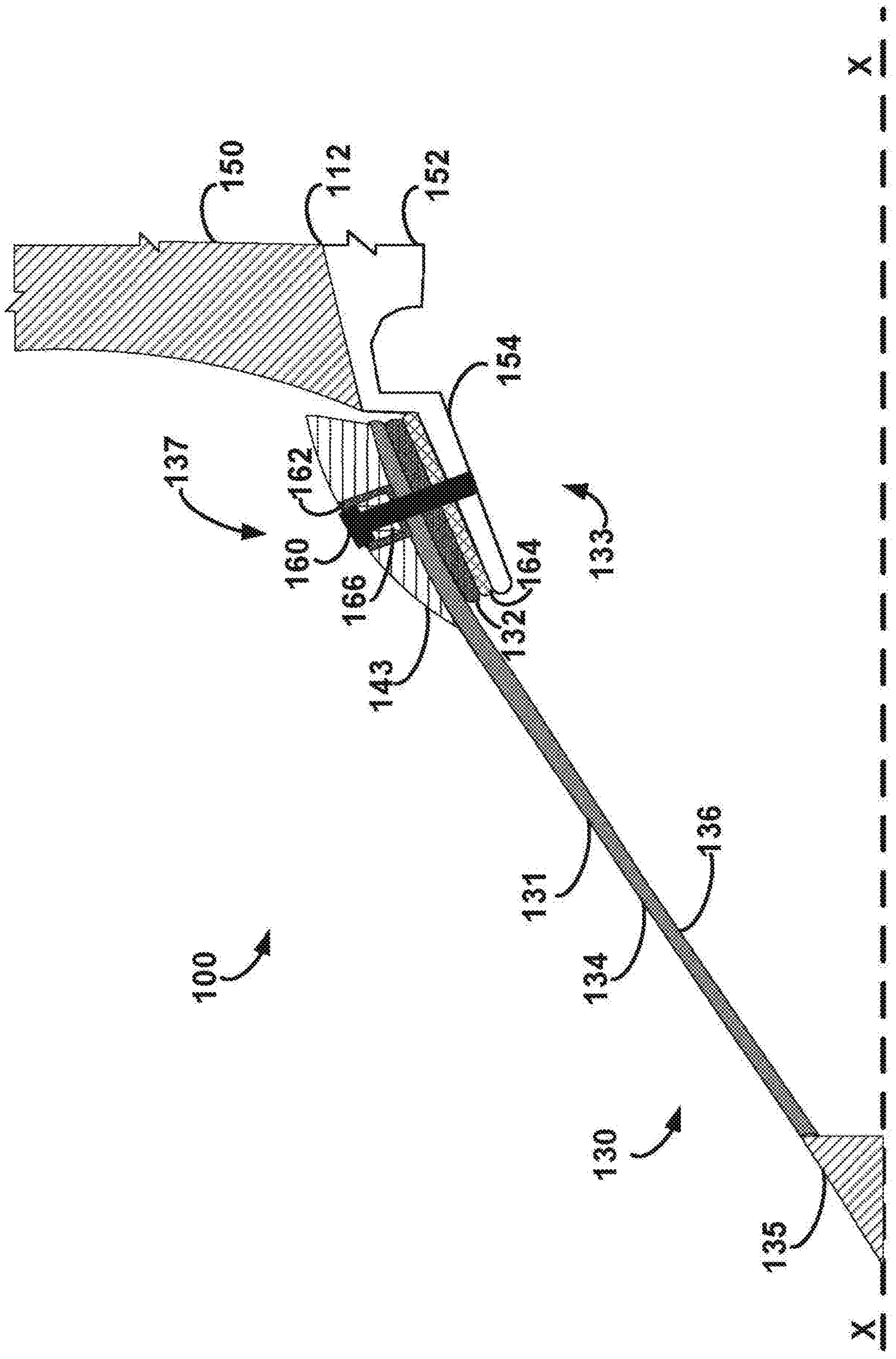
FIG. 3 is a schematic and conceptual diagram illustrating a longitudinal cross-section view of an example nosecone.

FIG. 3 is a schematic and conceptual diagram illustrating a longitudinal cross-section view of a portion of example nosecone 130 of gas turbine engine 100. Gas turbine engine 100 may be an example of gas turbine engine 10 of FIG. 1. Nosecone 130 may generally be described similarly to nosecone 30 of FIG. 2, except where differing as described below. Similar reference numerals indicate similar elements.

Nosecone 130 includes nosecone body 131 and tip 135. At an aft side of nosecone body 131, nosecone body 131 is attached to attachment ring 154 of wheel 152 of fan 112 by attachment assembly 133.

Attachment assembly 133 may include a first attachment location 137. First attachment location 137 includes fastener 160 which attaches nosecone body 131 to attachment ring 154. Fastener 160 may be a screw, a bolt, or the like. Where fastener 160 is a screw, attachment ring 154 may include a threaded nut to receive fastener 160. Similarly, where fastener is a bolt, attachment assembly 133 may include a nut radially inner to or integrated to attachment ring 154 to receive fastener 160.

In the illustrated example, first attachment location 137 includes patch band 132. Patch band 132 may be formed at or attached to inner surface 136 of nosecone body 131 and may surround fastener 160. Patch band 132 may be positioned between nosecone body 131 and attachment ring 154. Patch band 132 configured to increase the load-spreading area of fastener 160 to nosecone body 131. Patch band 132 may include a tear-resistant fiber.

One or more additional layers may optionally be positioned between nosecone body 131 and attachment ring 154. For example, additional layer 164 may be positioned radially inside of patch band 132. Additional layer 164 may include a stiff fiber, or a tough fiber, or both. Further layers (not illustrated), which may be positioned radially-inside or radially-outside of patch band 132, may optionally be included.

Nosecone 130 further includes airstream protrusion 143. Airstream protrusion 143 may be positioned on outer surface 134 of nosecone body and may extend into the airstream flowing over nosecone 130. Airstream protrusion 143 may be positioned upstream of fan blade 150 and may function to prepare the airstream for interaction with fan blade 150 by altering the flow path of the airstream.

In some examples, as illustrated, airstream protrusion 143 may be collocated with attachment location 137. Fastener 160 may pass through airstream protrusion 143. Airstream protrusion 143 may thus be configured to increase the load-spreading area of fastener 160 in nosecone body 131. In this way, mechanical stresses may be better distributed across a larger portion of nosecone body 131 rather than concentrating in a small area surrounding fastener 160.

In some examples, cup washer 162 be set within a recess of airstream protrusion 143. Fastener 160 be set within cup washer 162. Inclusion of cup washer 162 may be advantageous relative to a flat washer, because cup-washer 162 may further increase the load-spreading area of fastener 160 throughout a thickness of airstream protrusion 143, as well as across the external surface to airstream protrusion 143. Cup washer 162 may thus distribute mechanical forces throughout a relatively larger area of nosecone body 131 than examples which do not include a washer. In some examples, cup washer may include balance weight 166. Balance weight 166 may be a removable and optional component which functions to fill space and stabilize fastener 160 within cup washer 162.

Nosecone 130 may robustly attach nosecone body 131 to fan 112 by inclusion of a fastener 160 at attachment location 137. Fastener 160 may pass through airstream protrusion 143, patch band 132, additional layer 164, and attachment ring 154 to securely attach nosecone 130 to fan 112. Forces due to vibrations during operation of gas turbine engine 100 and/or impacts from hailstones or bird strikes may be more evenly spread by attachment assembly 133, which may result in a robust, lightweight, and high-performance nosecone.

Figure 4:
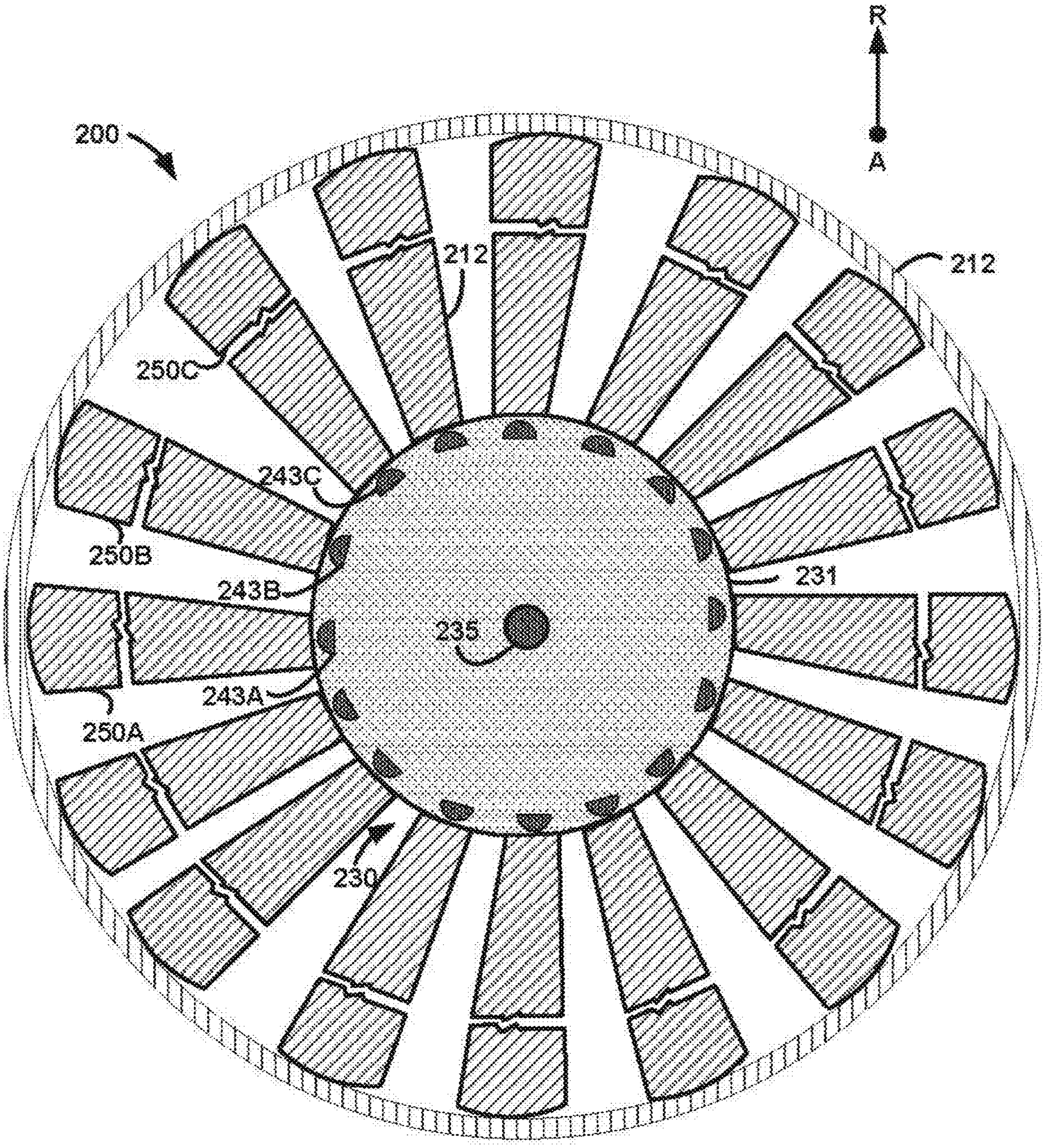
FIG. 4 is a schematic and conceptual front view of an example nosecone which includes a plurality of airstream protrusions.

FIG. 4 is a schematic and conceptual front view of example nosecone 230. Nosecone 230 may be an example of nosecone 130 of FIG. 3, except where differing as described below. Similar reference numerals refer to similar elements.

Nosecone 230 is attached to gas turbine engine 200. Gas turbine engine 200 includes fan 212. Fan 212 includes a plurality of fan blades 250 which include first fan blade 250A, second fan blade 250B, and third fan blade 250C. Although fan 212 is illustrated as including 16 total fan blades, in other examples fan 212 may include 17 fan blades, or 18 fan blades, or 19 fan blades, or 20 fan blades, or 22 fan blades, or 24 fan blades, or some other number of fan blades.

Nosecone 230 includes a plurality of airstream protrusions 243 defined by or attached to nosecone body 231. Plurality of airstream protrusions 243 include first airstream protrusion 243A, second airstream protrusion 243B, and 243C. As such, nosecone 230 may include an airstream protrusion that corresponds to each respective fan blade. First airstream protrusion 243A may be positioned upstream of first fan blade 250A. The flow path of air flowing over nosecone 230 from tip 235 to the aft side may be altered by first airstream protrusion 243A before interacting with first fan blade 250A. The modification of the flow path by first airstream protrusion 243A may function to effectively increase a chord length of first fan blade 250A or reduce losses associated with flow transitioning from the nosecone to the blade, which may improve the performance of fan 212.

Figure 5:
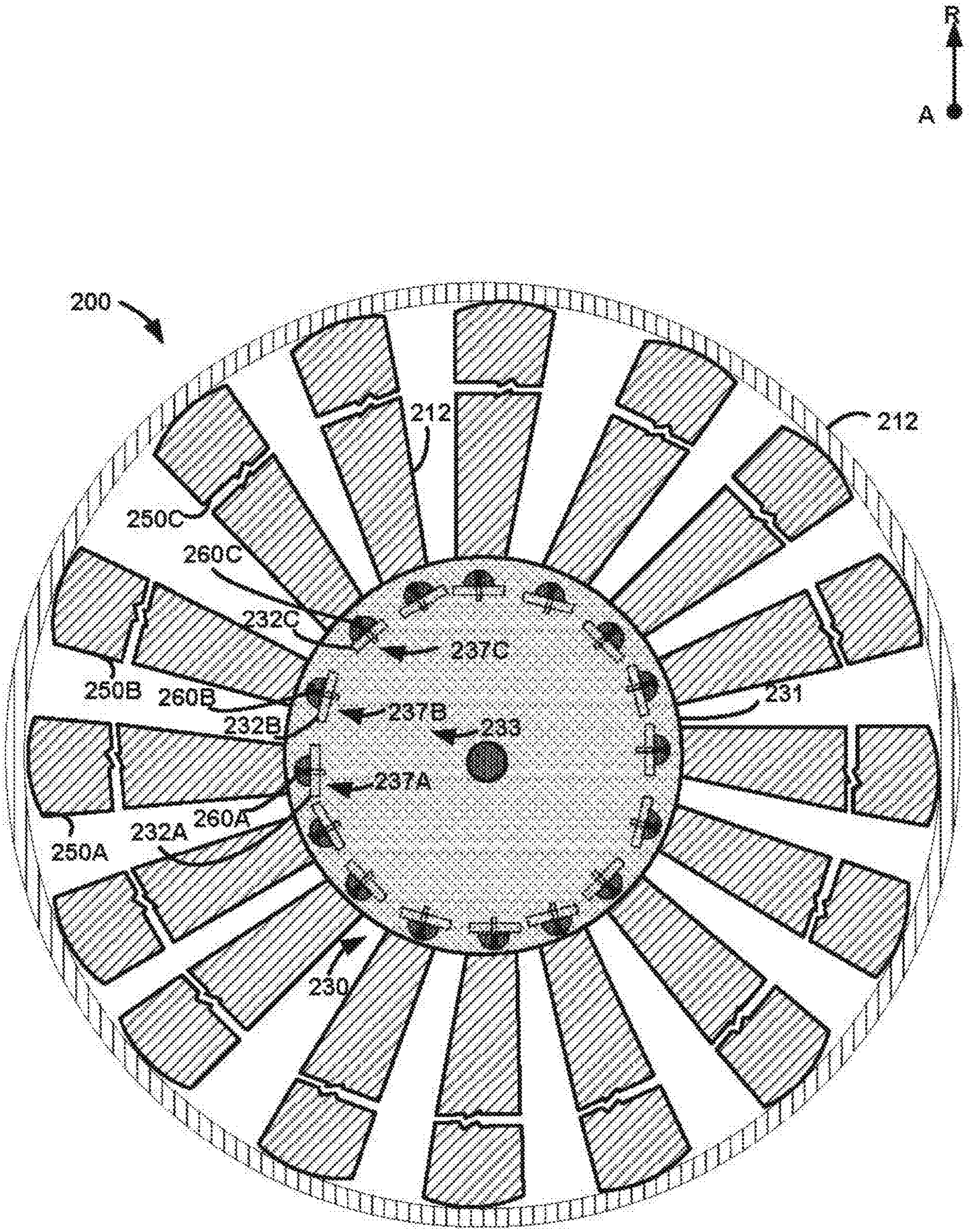
FIG. 5 is a schematic and conceptual front view of the example nosecone of FIG. 4, illustrating further details of the attachment assembly.

FIG. 5 is a schematic and conceptual front view of the example nosecone 230 of FIG. 4, illustrating further details of attachment assembly 233. Elements illustrated in broken lines are located radially inside of nosecone body 231.

Attachment assembly 233 may include a plurality of attachment locations 237 which include first attachment location 237A, second attachment location 237B, and third attachment location 237C. Each attachment location of plurality of attachment locations 237 may be displaced from every other attachment location. Nosecone 230 may be attached to fan 212 (e.g., by one or more fasteners) at each of the plurality of attachment locations 237.

First attachment location 237A may include fastener 260A. Fastener 260A may be a bolt or a screw. Fastener 260 may pass through first airstream protrusion 243A, nosecone body 231, and patch band 232A before being secured to fan 212. Arranged in this way, attachment assembly 233 may be less prone to crack or otherwise fail if nosecone 230 is subjected to an impact than other nosecones.

Figure 6:
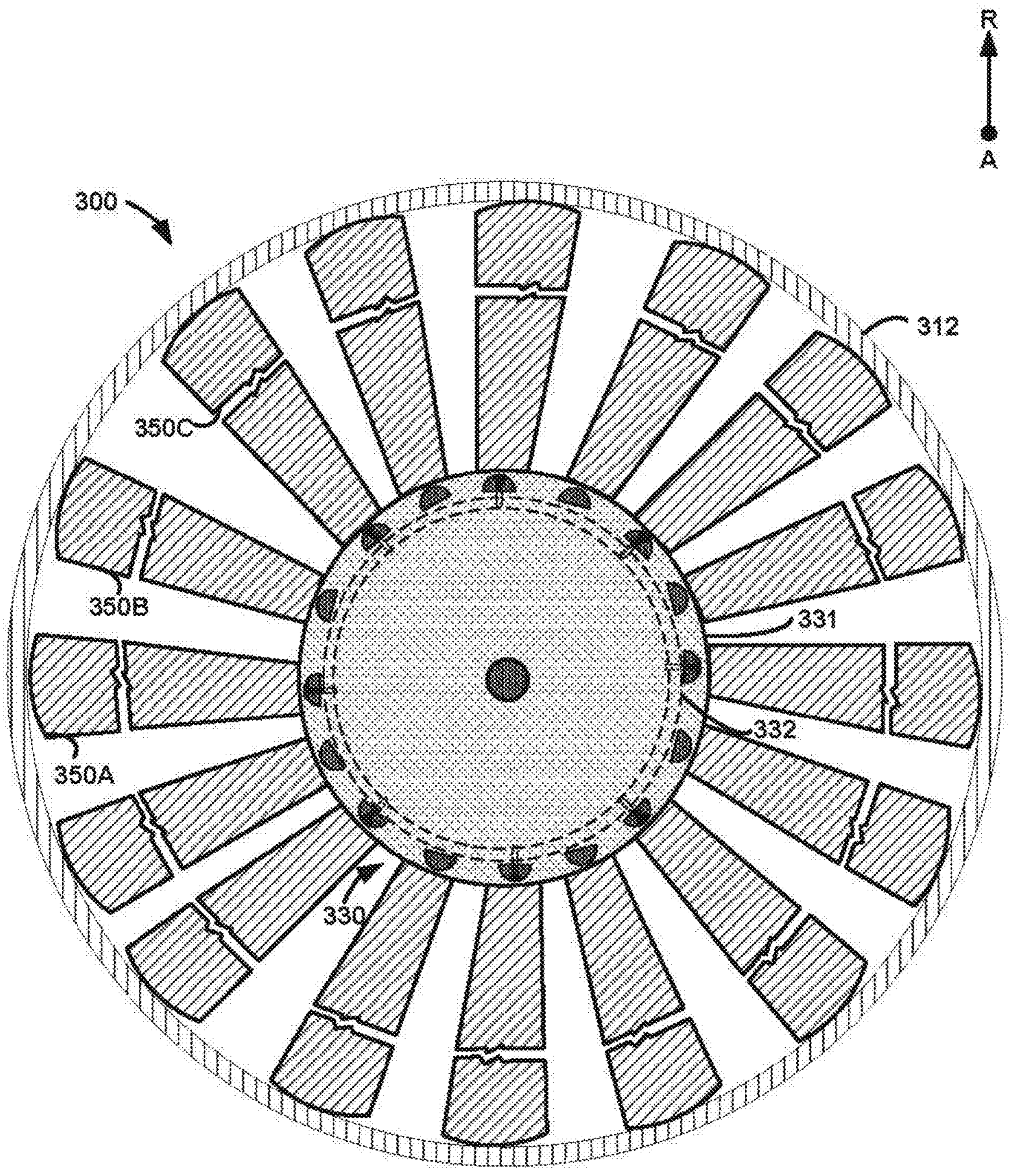
FIG. 6 is a schematic and conceptual front view illustrating an example nosecone.

FIG. 6 is a schematic and conceptual front view illustrating example nosecone 330 mounted to fan 312 of gas turbine engine 300. Nosecone 330 may generally be described similarly to nosecone 230 of FIGS. 4-5, except where differing as described below. Some reference numerals are omitted for improved clarity.

Fan 312 includes first fan blade 350A, second fan blade 350B, and third fan blade 350C. Nosecone 330 includes nosecone body 331 and attachment assembly 333. As described above, each fan blade may have a corresponding airstream protrusion disposed upstream of the fan blade. Similarly, as described above, attachment locations of attachment assembly 333 may be collocated with airstream protrusions. However, in some examples, there may be fewer attachment locations than airstream protrusions, because it may not be necessary to attach nosecone 330 to fan 312 at every fan blade location. Thus, in some examples, attachment assembly 333 may include an attachment location at every other airstream protrusion. Furthermore, in some examples, patch band 332 may be a single continuous patch band that surrounds the central longitudinal axis of the nosecone.

FIGS. 7-10 are schematic and conceptual diagrams illustrating example portions of example attachment assemblies of a nosecone. FIGS. 7-10 are schematic and conceptual illustrating example arrangements for an individual attachment location.

Figure 7:
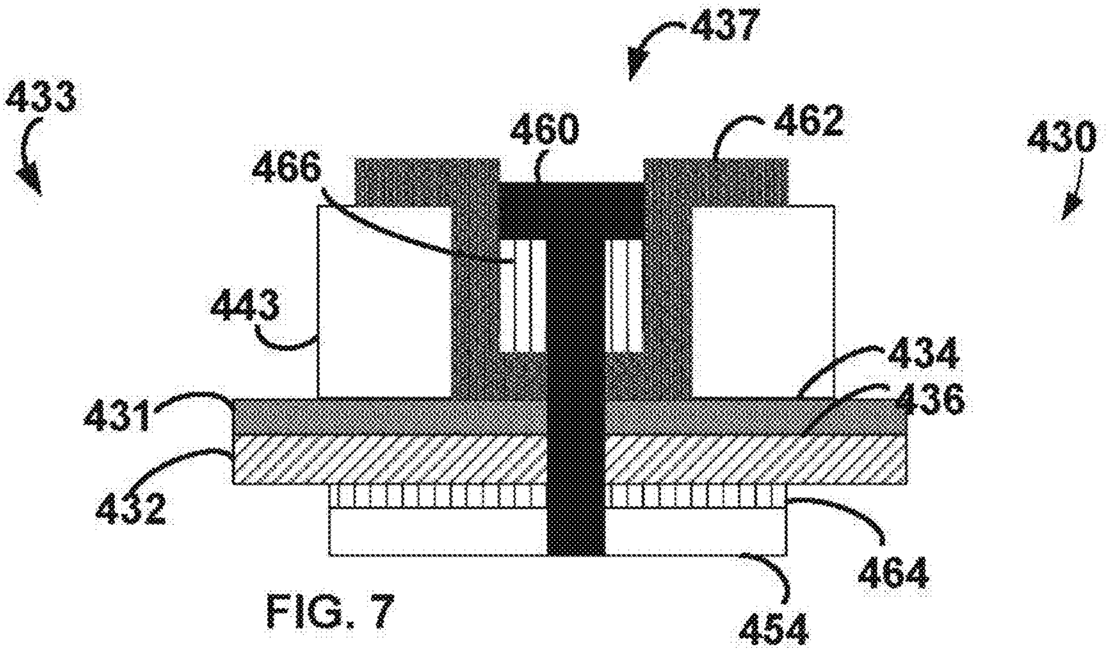
FIGS. 7-10 are schematic and conceptual diagrams illustrating example portions of example attachment assemblies of a nosecone.

FIG. 7 illustrates attachment location 437 of attachment assembly 433 of nosecone 430. Attachment assembly 433 is configured to attach nosecone body 431 to attachment ring 454 of a wheel (152, FIG. 3) of a fan (112, FIG. 3).

Attachment location 437 includes components arranged in a way to increase the impact resistance of nosecone 430. Attachment location 437 includes airstream protrusion 443 positioned on outer surface 434 of nosecone body 431. Attachment location 437 further includes patch band 432 positioned at inner surface 436. Patch band 432 includes a tear-resistant fiber. Attachment location 437 further includes additional layer 464.

Attachment location 437 includes fastener 460 which passes through airstream protrusion 443, nosecone body 431, patch band 432, additional layer 464, and into attachment ring 454. Arranged as such, attachment location 437 may spread the load of impact forces. The load-spreading properties of attachment location 437 may spread mechanical stresses which may build up around fastener 460 and eventually cause nosecone body 431 to fail.

In some examples attachment location 437 includes a washer configured to increase the load-spreading area of fastener 460 to airstream protrusion 443. In some examples, the washer may be cup washer 462. Cup washer 462 may be configured to sit in a recess in airstream protrusion and extend beyond airstream protrusion 443 into the passing airstream. Cup washer 462, which sits on top of airstream protrusion 443, may cause relatively less drag than other attachment methods and/or may more completely secure fastener 460 than other attachment methods. In some examples, cup washer 462 may contain fastener 460 and one or more balance weights 466. One or more balance weights may mechanically support fastener 460 within cup washer 462.

Fastener 460 may be any suitable fastener for attaching nosecone body 431 to attachment ring 454. In some examples, fastener 460 may be selected from the group consisting of countersunk bolts, countersunk screws, flat fillister head screws, flat fillister head bolts, button head screws, button head bolts, button head screws, bi-hex bolts, and bi-hex screws. Other types of fasteners are also considered.

Figure 8:
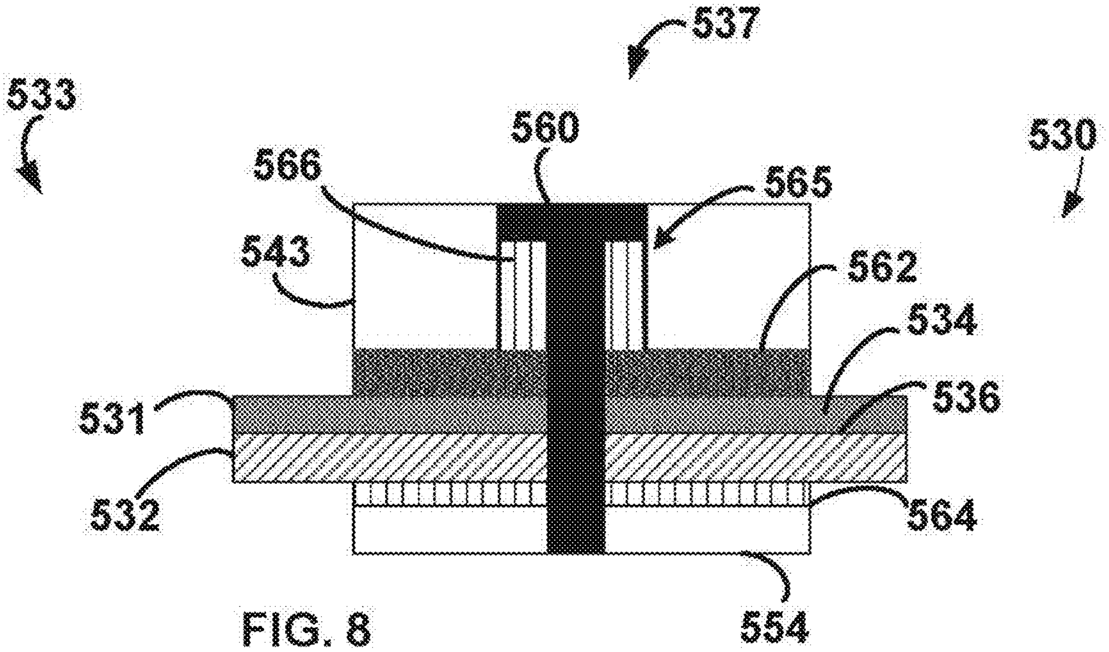
Figure 9:
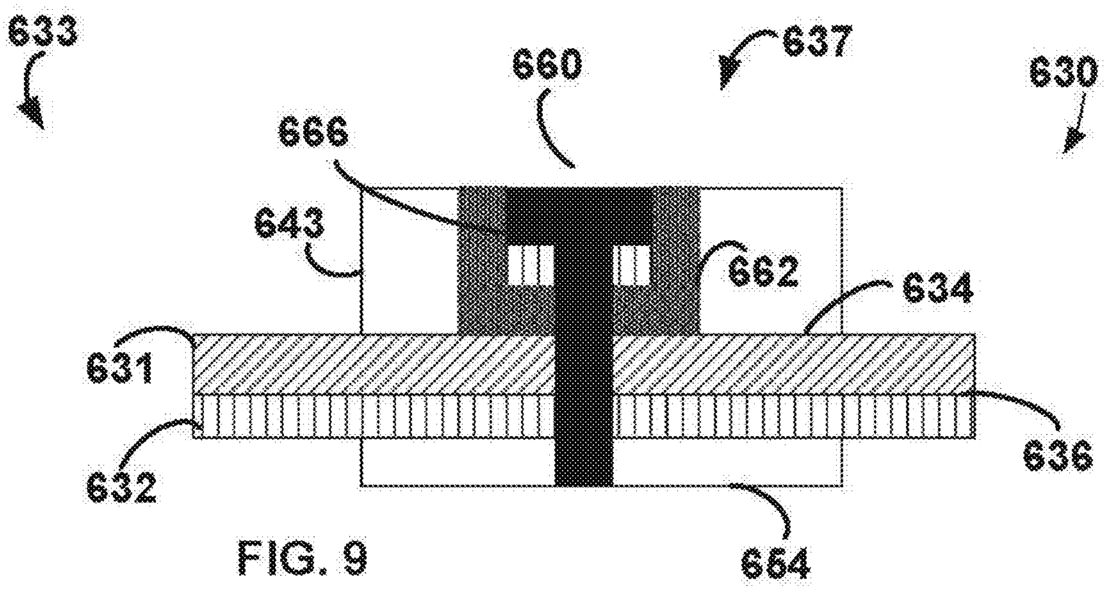
Figure 10:
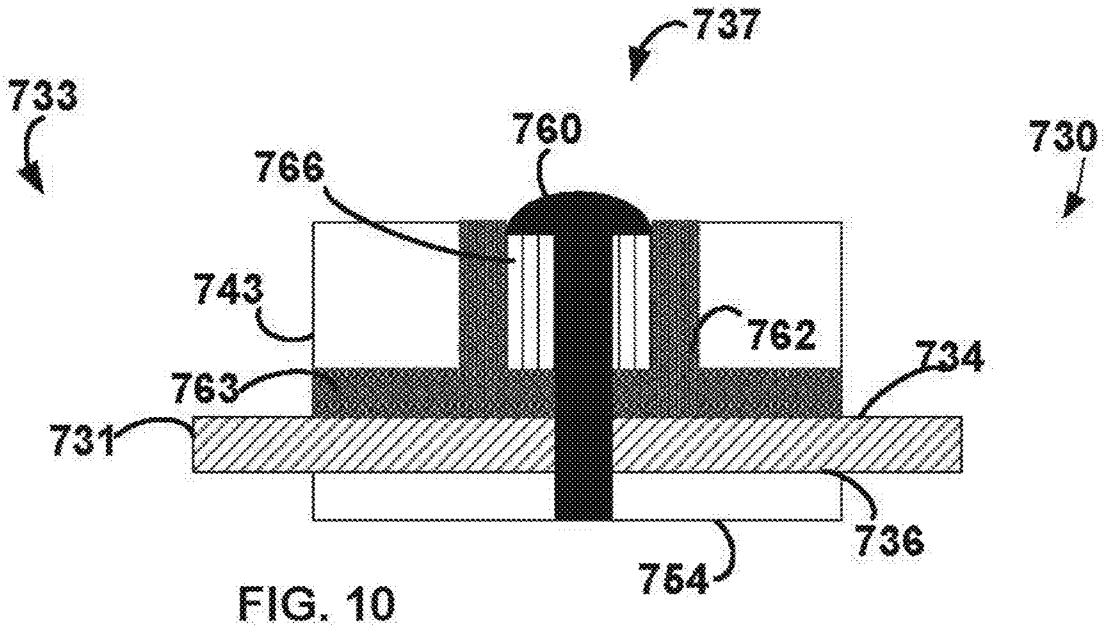

FIG. 8-10 illustrate attachment locations 537, 637, and 737, respectively. Attachment assembly 537, 637, and 737 may generally be described similarly to attachment location 437 of FIG. 7, except where differing as described below. Similar reference numerals indicate similar elements.

Washer 562 of attachment assembly 533 of FIG. 8 is a flat washer located within airstream protrusion 543. Arranging attachment assembly 533 of FIG. 8 with flat washer 562 may result in an attachment assembly that is relatively less complex and easier to manufacture. In some cases, balance weight 566 may reside in pocket 565 cut into airstream protrusion 543. In some examples, balance weights 566 may include more than one individual balance weight. Balance weights may be added or removed to adjust the depth at which fastener 560 sits within airstream protrusion 543.

Washer 662 of attachment assembly 633 of FIG. 9 is also a cup washer. However, unlike the cup washer of FIG. 7, cup washer 662 does not extend from airstream protrusion 643 into the passing airstream. In some examples, completely sinking cup washer 662 into airstream protrusion 643 may result in less drag than other arrangements. Attachment location 637 also only includes patch band 632 radially inside of nosecone body 631, omitting other additional layers.

Attachment location 737 of FIG. 10 includes a similar countersunk cup washer to FIG. 9. Fastener 760 of FIG. 10 include a button head screw, which may be result in less drag than other arrangements. In some examples, cup washer 762 may include base 763, which may extend along the entire base of airstream protrusion 743. Put differently, cup washer 762 may be positioned between outer surface 734 of nosecone body 731 and airstream protrusion 743 at every location at the base of airstream protrusion 743.

Figure 11:
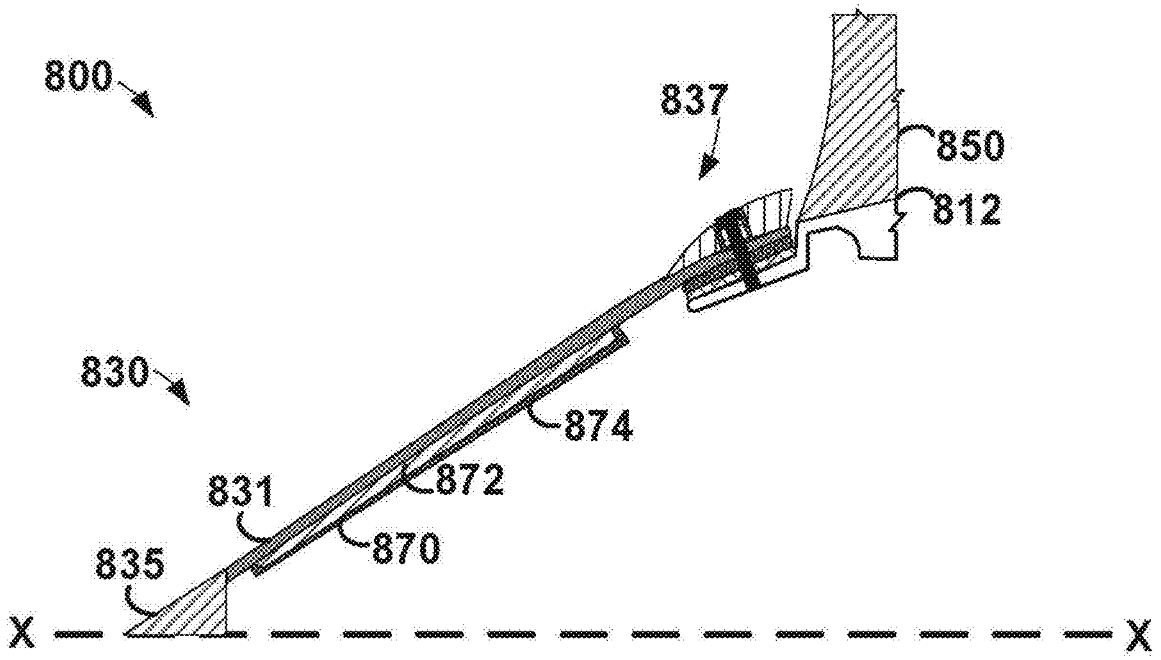
FIGS. 11-12 are schematic and conceptual diagram illustrating longitudinal cross-section views of example nosecones which include stiffening ribs.
Figure 12:
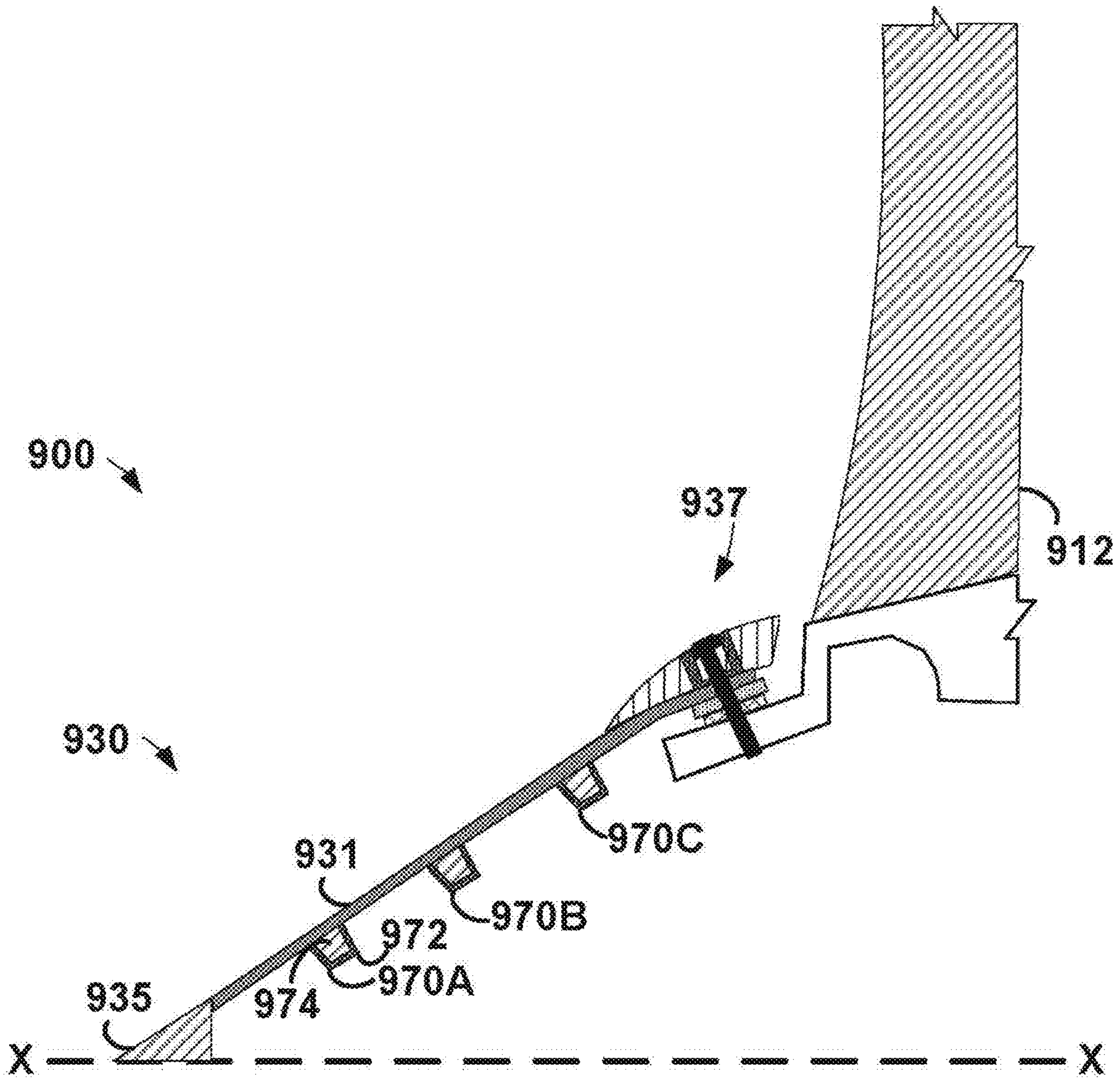

FIGS. 11-12 are schematic and conceptual diagram illustrating longitudinal cross-section views of example nosecones which include stiffening ribs. FIG. 11 illustrates gas turbine engine 800 which includes nosecone 830. Nosecone 830 of FIG. 11 may be an example of nosecone 130 of FIG. 3, and may be generally described similarly, except where differing as described below. Similar reference numerals indicate similar elements.

In some examples, an impact near a mid-span region of nosecone 830 (e.g., aft of tip 835 and forward of attachment location 837) may result in large deflections and stress. One way to form a nosecone robust enough to handle such an impact is to increase a thickness of the side wall of the nosecone body. However, such a solution may be relatively heavy and costly to produce. In an aspect of the disclosure, nosecone 830 includes at least one stiffening rib 870. Stiffening rib 870 extends along a length of nosecone body 831. Stiffening rib 870 may be integrally formed or attached to nosecone body 831.

In some examples, stiffening rib 870 may include a laminate structure which includes multiple layers. For example, stiffening rib may include first layer 872, second layer 874, and optional additional layers (not shown). In some examples, first layer 872 may include a low-density foam or honeycomb, which may advantageously reduce the weight added by stiffening rib 870. In such examples, to increase stiffness of stiffening rib 870, second layer 874 may be formed on or over the low-density foam or honeycomb.

Stiffening rib 870 may be formed as part of a layup or during a pause in a filament winding, overbraiding, or roll wrapping of nosecone 830. Stiffening rib 870 may include any suitable material. In some example, stiffening rib may include a "top hat" structure. A top hat structure may include two standoff arms connected by a crown. In such examples, any or all of the stiff fiber, the tear-resistant fiber, or the tough fiber may be included in the top hat structure. The top hat structure may contain a void volume. In some examples, the void volume of the top hat structure may include a section of foam or honeycomb, as described above.

In some examples, as shown in FIG. 11, stiffening rib 870 may be disposed substantially parallel to central longitudinal axis X-X. Additionally, or alternatively, in some examples, as shown in FIG. 12, one or more stiffening ribs 970A, 970B, 970C may be disposed substantially perpendicularly to central longitudinal axis X-X. Stiffening ribs 970A, 970B, and/or 970C may include similar materials, laminates, or structures and stiffening rib 870 of FIG. 11. In some examples, stiffening ribs may be disposed at other angles relative to central longitudinal axis X-X. In some examples, inclusion of one or more stiffening ribs may enable a robust nosecone to be lightweight, because the nosecone body may be kept relatively thin and lightweight.

Figure 13:
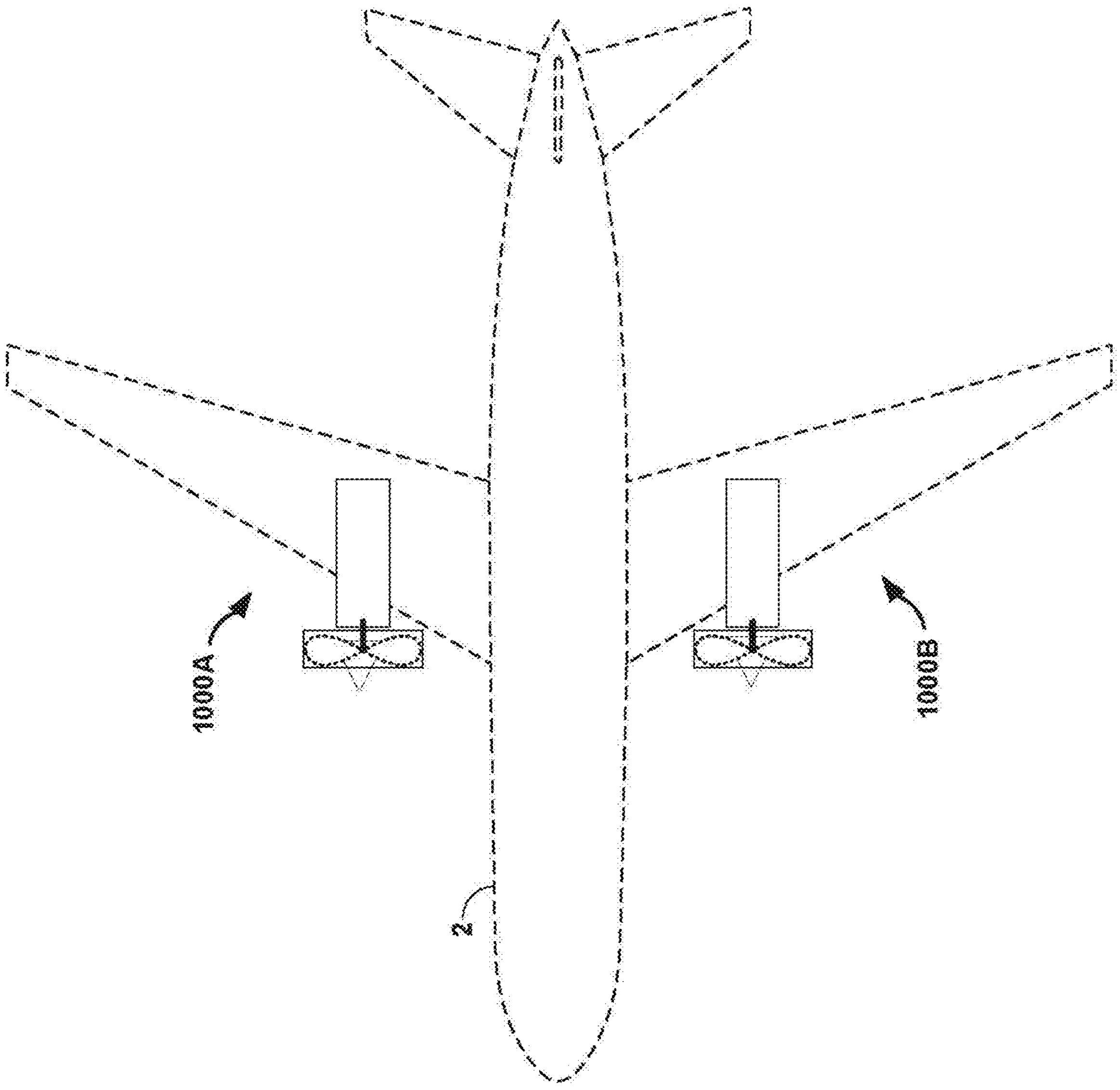
FIG. 13 is a conceptual diagram illustrating a top view of an example aircraft.

FIG. 13 is a conceptual diagram illustrating a top view of an example aircraft 2, in accordance with one or more aspects of the disclosure. Aircraft 2 of FIG. 13 may be aircraft that includes one or more turbine engines 1000A and 1000B (collectively, "turbine engines 1000"), which may provide thrust and/or electrical power to aircraft 2. Examples of aircraft 2 include, but are not limited to fixed wing, rotorcraft, vertical takeoff (e.g., VTOL), short takeoff (e.g., STOL), and the like.

Each of turbine engines 1000 may be an example of turbine engine 10 of FIG. 1. As one example, turbine engine 1000A may include a robust, light weight, and/or high-performing nosecone in accordance with one or more examples of the present disclosure.

The following numbered examples demonstrate one or more aspects of the disclosure.

Example 1: A nosecone for a gas turbine engine includes a nosecone body, the nosecone body substantially symmetrical around a central axis, the nosecone body including a side wall defining a diameter of the nosecone body that increases from a forward side of the nosecone body to an aft side of the nosecone body, and an attachment assembly, the attachment assembly configured to attach the nosecone body to the gas turbine engine, and a plurality of airstream protrusions attached to or integral with the nosecone body, a first airstream protrusion of the plurality of airstream protrusions positioned upstream of a first fan blade of a plurality of fan blades to prepare an airstream flowing over the nosecone body for interaction with the first fan blade, wherein the attachment assembly includes a plurality of attachment locations, and wherein a first attachment location of the plurality of attachment locations is collocated with the first airstream protrusion of the plurality of airstream protrusions.

Example 2: The nosecone of example 1, wherein each respective airstream protrusion of the plurality of airstream protrusions is positioned upstream of a corresponding fan blade of a plurality of fan blades.

Example 3: The nosecone of example 1, wherein the first attachment location includes a fastener which passes through the airstream protrusion.

Example 4: The nosecone of any of examples 1 through 3, wherein the first attachment location further comprises a washer, the washer configured to increase the load-spreading area of the fastener to the airstream protrusion.

Example 5: The nosecone of example 4, wherein the washer is a cup washer positioned within a recess of the airstream protrusion.

Example 6: The nosecone of example 5, wherein the cup washer extends beyond the airstream protrusion into the passing airstream.

Example 7: The nosecone of any of examples 5 and 6, wherein the cup washer does not extend beyond the airstream protrusion into the passing airstream.

Example 8: The nosecone of any of examples 1 through 7, wherein the number of attachment locations in the plurality of attachment locations is fewer than the number of airstream protrusions in the plurality of airstream protrusions.

Example 9: The nosecone of any of examples 1 through 8, wherein the first attachment location comprises at least one patch band, the patch band surrounding the fastener and comprising the tear-resistant fiber, wherein the patch band is configured to increase the load-spreading area of the fastener to the nosecone body.

Example 10: The nosecone of any of examples 1 through 9, further comprising at least one stiffening rib attached to or integral with the side wall of the nosecone body, the at least one stiffening rib configured to increase the impact resistance of the nosecone.

Example 11: The nosecone of any of examples 1 through 10, wherein at least one of the nosecone body or the attachment assembly comprises a tear-resistant fiber.

Example 12: The nosecone of example 11, wherein the tear-resistant fiber has a tensile strength of at least 5.0 gigapascals (GPa) and a tensile modulus of at least 160 GPa.

Example 13: The nosecone of example 12, wherein the tear-resistant fiber includes poly (p-phenylene-2,6-benzobisoxazole)) (PBO) fiber.

Example 14: The nosecone of any of examples 11 through 13, wherein the tear-resistant fiber is integrated into the side wall of the nosecone body.

Example 15: The nosecone of any of examples 11 through 14, wherein the tear-resistant fiber is protected from the external environment by one or more layers disposed over the tear-resistant fiber.

Example 16: The nosecone of any of examples 1 through 15, wherein the nosecone body comprises a stiff fiber.

Example 17: A gas turbine engine, the gas turbine engine includes a nosecone includes a nosecone body, the nosecone body substantially symmetrical around a central axis, the nosecone body including a side wall defining a diameter of the nosecone body that increases from a forward side of the nosecone body to an aft side of the nosecone body, and an attachment assembly, the attachment assembly configured to attach the nosecone body to the gas turbine engine, and a plurality of airstream protrusions attached to or integral with the nosecone body, a first airstream protrusion of the plurality of airstream protrusions positioned upstream of a first fan blade of a plurality of fan blades to prepare an airstream flowing over the nosecone body for interaction with the first fan blade, wherein the attachment assembly includes a plurality of attachment locations, and wherein a first attachment location of the plurality of attachment locations is collocated with the first airstream protrusion of the plurality of airstream protrusions.

Example 18: The gas turbine engine of example 17, wherein each respective airstream protrusion of the plurality of airstream protrusions is positioned upstream of a corresponding fan blade of a plurality of fan blades.

Example 19: An airframe includes a first turbine engine of one or more turbine engines, the first turbine engine includes a nosecone body, the nosecone body substantially symmetrical around a central axis, the nosecone body including a side wall defining a diameter of the nosecone body that increases from a forward side of the nosecone body to an aft side of the nosecone body, and an attachment assembly, the attachment assembly configured to attach the nosecone body to the gas turbine engine, and a plurality of airstream protrusions attached to or integral with the nosecone body, a first airstream protrusion of the plurality of airstream protrusions positioned upstream of a first fan blade of a plurality of fan blades to prepare an airstream flowing over the nosecone body for interaction with the first fan blade, wherein the attachment assembly includes a plurality of attachment locations, and wherein a first attachment location of the plurality of attachment locations is collocated with the first airstream protrusion of the plurality of airstream protrusions.

Example 20: The airframe of example 19, wherein each respective airstream protrusion of the plurality of airstream protrusions is positioned upstream of a corresponding fan blade of a plurality of fan blades.

Various examples have been described. These and other examples are within the scope of the following claims.

What is claimed is:

1. A nosecone for a gas turbine engine, the nosecone comprising:

a nosecone body, the nosecone body substantially symmetrical around a central axis, the nosecone body including a side wall defining a diameter of the nosecone body that increases from a forward side of the nosecone body to an aft side of the nosecone body, and an attachment assembly, the attachment assembly configured to attach the nosecone body to the gas turbine engine, and a plurality of airstream protrusions attached to or integral with the nosecone body and extending from the nosecone body into an airstream passing over the nosecone body, a first airstream protrusion of the plurality of airstream protrusions defining an aerodynamic shape, wherein the aerodynamic shape protrudes above an outermost surface of an outer surface of the nosecone and is positioned upstream of a first fan blade of a plurality of fan blades to prepare the airstream flowing over the nosecone body for interaction with the first fan blade, wherein:

the attachment assembly includes a plurality of attachment locations, a first attachment location of the plurality of attachment locations is collocated with the first airstream protrusion of the plurality of airstream protrusions, the first attachment location includes a fastener which passes through the first airstream protrusion, and the first airstream protrusion increases a load-spreading area of the fastener to the nosecone body.

2. The nosecone of claim 1, wherein each respective airstream protrusion of the plurality of airstream protrusions is positioned upstream of a corresponding fan blade of a plurality of fan blades.

3. The nosecone of claim 1, wherein the first attachment location further comprises a washer, the washer configured to increase the load-spreading area of the fastener to the airstream protrusion.

4. The nosecone of claim 3, wherein the washer is a cup washer positioned within a recess of the airstream protrusion.

5. The nosecone of claim 4, wherein the cup washer extends beyond the airstream protrusion into the passing airstream.

6. The nosecone of claim 1, wherein the first attachment location comprises a patch band, the patch band surrounding the fastener and comprising a tear-resistant fiber, wherein the patch band is configured to increase the load-spreading area of the fastener to the nosecone body.

7. The nosecone of claim 1, wherein at least one of the nosecone body or the attachment assembly comprises a tear-resistant fiber.

8. The nosecone of claim 7, wherein the tear-resistant fiber has a tensile strength of at least 5.0 gigapascals (GPa) and a tensile modulus of at least 160 GPa.

9. The nosecone of claim 8, wherein the tear-resistant fiber includes poly (p-phenylene-2,6-benzobisoxazole) (PBO) fiber.

10. The nosecone of claim 7, wherein the tear-resistant fiber is integrated into the side wall of the nosecone body.

11. The nosecone of claim 7, wherein the tear-resistant fiber is protected from the external environment by one or more layers disposed over the tear-resistant fiber.

12. The nosecone of claim 1, wherein the nosecone body comprises a stiff fiber.

13. A gas turbine engine, the gas turbine engine comprising:

a nosecone, the nosecone comprising:

a nosecone body, the nosecone body substantially symmetrical around a central axis, the nosecone body including a side wall defining a diameter of the nosecone body that increases from a forward side of the nosecone body to an aft side of the nosecone body, and an attachment assembly, the attachment assembly configured to attach the nosecone body to the gas turbine engine, and a plurality of airstream protrusions attached to or integral with the nosecone body and extending from the nosecone body into an airstream passing over the nosecone body, a first airstream protrusion of the plurality of airstream protrusions defining an aerodynamic shape, wherein the aerodynamic shape protrudes above an outermost surface of an outer surface of the nosecone and is positioned upstream of a first fan blade of a plurality of fan blades to prepare the airstream flowing over the nosecone body for interaction with the first fan blade, wherein:

the attachment assembly includes a plurality of attachment locations, a first attachment location of the plurality of attachment locations is collocated with the first airstream protrusion of the plurality of airstream protrusions, the first attachment location includes a fastener which passes through the first airstream protrusion, and the first airstream protrusion increases a load-spreading area of the fastener to the nosecone body.

14. The gas turbine engine of claim 13, wherein each respective airstream protrusion of the plurality of airstream protrusions is positioned upstream of a corresponding fan blade of a plurality of fan blades.

15. An airframe comprising:

a first turbine engine of one or more turbine engines, the first turbine engine comprising a nosecone, the nosecone comprising:

a nosecone body, the nosecone body substantially symmetrical around a central axis, the nosecone body including a side wall defining a diameter of the nosecone body that increases from a forward side of the nosecone body to an aft side of the nosecone body, and an attachment assembly, the attachment assembly configured to attach the nosecone body to the first turbine engine, and a plurality of airstream protrusions attached to or integral with the nosecone body and extending from the nosecone body into an airstream passing over the nosecone body, a first airstream protrusion of the plurality of airstream protrusions defining an aerodynamic shape, wherein the aerodynamic shape protrudes above an outermost surface of an outer surface of the nosecone and is positioned upstream of a first fan blade of a plurality of fan blades to prepare the airstream flowing over the nosecone body for interaction with the first fan blade, wherein:

the attachment assembly includes a plurality of attachment locations, a first attachment location of the plurality of attachment locations is collocated with the first airstream protrusion of the plurality of airstream protrusions, the first attachment location includes a fastener which passes through the first airstream protrusion, and the first airstream protrusion increases a load-spreading area of the fastener to the nosecone body.

16. The airframe of claim 15, wherein each respective airstream protrusion of the plurality of airstream protrusions is positioned upstream of a corresponding fan blade of a plurality of fan blades.

17. The nosecone of claim 1, wherein the aerodynamic shape defined by the first airstream protrusion includes a cross-section that is substantially quarter-circular, or quarter-elliptical, or half-circular, or half-elliptical.

* * * * *